(12) United States Patent
Miyahara

(10) Patent No.: US 12,596,927 B2
(45) Date of Patent: Apr. 7, 2026

(54) INFORMATION PROCESSING SYSTEM HAVING AN INFORMATION PROCESSING DEVICE AND MULTIPLE PARTIAL RESERVOIRS THAT ARE TRAINED, INFORMATION PROCESSING DEVICE THAT TRAINS MULTIPLE PARTIAL RESERVOIRS, AND NON-TRANSITORY COMPUTER READABLE MEMORY MEDIUM THAT STORES INFORMATION PROCESSING PROGRAM FOR TRAINING MULTIPLE PARTIAL RESERVOIRS

(71) Applicant: FUJITSU LIMITED, Kawasaki (JP)

(72) Inventor: Shoichi Miyahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 17/958,476

(22) Filed: Oct. 3, 2022

(65) Prior Publication Data

US 2023/0023123 A1 Jan. 26, 2023

Related U.S. Application Data

(63) Continuation of application No. PCT/JP2020/015877, filed on Apr. 8, 2020.

(51) Int. Cl.
*G06N 3/04* (2023.01)
*G06N 3/045* (2023.01)
(Continued)

(52) U.S. Cl.
CPC ............... *G06N 3/08* (2013.01); *G06N 3/045* (2023.01); *G06N 3/065* (2023.01)

(58) Field of Classification Search
CPC ........... G06N 3/045; G06N 3/065; G06N 3/08
See application file for complete search history.

(56) References Cited

U.S. PATENT DOCUMENTS

2004/0015459 A1 1/2004 Jaeger
2014/0214738 A1* 7/2014 Pickett .................. G06N 3/065 706/27

(Continued)

FOREIGN PATENT DOCUMENTS

CN 109009033 A 12/2018
CN 109640351 A 4/2019

(Continued)

OTHER PUBLICATIONS

Hassan, Amr M., Hai Helen Li, and Yiran Chen. "Hardware implementation of echo state networks using memristor double crossbar arrays." 2017 International Joint Conference on Neural Networks (IJCNN). IEEE, 2017. (Year: 2017).*

(Continued)

*Primary Examiner* — Hal Schnee
(74) *Attorney, Agent, or Firm* — Fujitsu Intellectual Property Center

(57) ABSTRACT

A reservoir includes a common input layer, first and second output layers that outputs a first and a second readout values based on an input, a first partial reservoir including the input layer and the first output layer, and a second partial reservoir having a size between the input layer and the second output layer larger than the size of the first partial reservoir, and the training processing including: first calculating a third output weight that reduces a difference between a first product sum value of a third readout value and a first output weight; and second calculating a fourth output weight that reduces a difference between a second product sum value of a fourth readout value and a second output weight and differential teaching data that is a difference between a third product sum value of the third readout value and the third output weight and the teaching data.

7 Claims, 16 Drawing Sheets

(51) Int. Cl.

| | |
|---|---|
| ***G06N 3/06*** | (2006.01) |
| ***G06N 3/065*** | (2023.01) |
| ***G06N 3/08*** | (2023.01) |

(56) References Cited

U.S. PATENT DOCUMENTS

| | | | | |
|---|---|---|---|---|
| 2017/0116515 | A1* | 4/2017 | Abel | G06N 3/0675 |
| 2018/0285729 | A1* | 10/2018 | Nakano | G06N 3/044 |
| 2018/0293495 | A1 | 10/2018 | Okumura et al. | |

FOREIGN PATENT DOCUMENTS

| | | | |
|---|---|---|---|
| JP | 2004-511866 | A | 4/2004 |
| JP | 2008-117381 | A | 5/2008 |
| JP | 2018-180701 | A | 11/2018 |
| WO | 2018/212201 | A1 | 11/2018 |

OTHER PUBLICATIONS

Freiberger, Matthias, et al. "Improving time series recognition and prediction with networks and ensembles of passive photonic reservoirs." IEEE Journal of Selected Topics in Quantum Electronics 26.1 (2019): 1-11. (Year: 2019).*

Keuninckx, Lars, Jan Danckaert, and Guy Van der Sande. "Real-time audio processing with a cascade of discrete-time delay line-based reservoir computers." Cognitive Computation 9.3 (2017): 315-326. (Year: 2017).*

Akiyama, Takanori et al., "Analysis on Characteristics of Multi-Step Learning Echo State Networks for Nonlinear Time Series Prediction", Proceedings of The 2019 International Joint Conference on Neural Networks (IJCNN'19), Jul. 14, 2019, XP033621712, doi:10.1109/ijcnn.2019.8851876, pp. 1-8.

Gallicchio, Claudio et al., "Deep reservoir computing: A critical experimental analysis", Neurocomputing, vol. 268, Apr. 29, 2017, pp. 87-99, XP085170840, doi:10.1016/j.neucom.2016.12.089.

Hassan, Amr M. et al., "Hardware Implementation of Echo State Networks Using Memristor Double Crossbar Arrays", Proceedings of The 2017 International Joint Conference on Neural Networks (IJCNN'17), May 14, 2017, pp. 2171-2177, XP033112267, doi:10.1109/IJCNN.2017.7966118.

Tanaka, Gouhei et al., "Recent Advances in Physical Reservoir Computing: A Review", arxiv.org, Cornell University Library, 201 OLIN Library Cornell University Ithaca, NY 14853, Apr. 15, 2019, XP081257166, doi:10.48550/arXiv.1808.04962, pp. 1-64.

Extended European Search Report dated Apr. 12, 2023 for corresponding European Patent Application No. 20930582.0, 9 pages.

Gohei Tanaka, "Concept of Reservoir Computing and Its Recent Trends", The Journal of the Institute of Electronics, Information and Communication Engineers, vol. 102, No. 2, pp. 108-113, Feb. 2019 (Total 14 pages) [online] https://www.journal.ieice.org/bin/pdf_link.php?fname=k102_2_108&lang=j&year-2019.pdf.

Chao Du et al., "Reservoir Computing Using Dynamic Memristors for Temporal Information Processing", Nature Communications, DOI: 10.1038/s41467-017-02337-y, pp. 1-10 (Total 10 pages) [online] https://www.nature.com/articles/s41467-017-02337-y.pdf.

Boudjelal Meftah et al., "Novel Approach Using Echo State Networks for Microscopic Cellular Image Segmentation", CrossMark, Cognitive Computation (2016), vol. 8, Issue 2, pp. 237-245, DOI: 10.1007/s12559-015-9354-8, Springer Science+Business Media New York 2015, Aug. 30, 2015 (Total 9 pages) [online] https://link.springer.com/content/pdf/10.1007/s12559-015-9354-8.pdf [retrieved on Jul. 15, 2020] (Cited in ISR).

International Search Report (Form PCT/ISA/210), mailed in connection with PCT/JP2020/015877 and mailed Jul. 28, 2020 (Total 3 pages).

* cited by examiner

30
TERMINAL DEVICE
32
TERMINAL DEVICE
NW
18
PHYSICAL RESERVOIR
10
12
CPU
14
MAIN MEMORY
16
INTERFACE DEVICE
28
20
TRAINING PROGRAM
22
INFERENCE PROGRAM
24
TRAINING DATA
26
RESERVOIR MODEL DATA
OUTPUT WEIGHT y1_t = f11(x1) + f12*(x2) + ... + f15*(x5) + α*y1_t-1
IN1
IN_1
IN_2
IN_3
DAC
x1
x2
x3
x4
x5
C_RSV
N1
N2
N3
N4
N5
f11
f12
f13
f14
f15
f21
f22
f23
f24
f25
f31
f32
f33
f34
f35
f41
f42
f43
f44
f45
f51
f52
f53
f54
f55
y1
y2
y3
y4
y5
ADC
w1
w2
w3
w4
w5
OUT1
FCL_1
FCL_2
FCL_3

M_I MID M_O

O_I O_M OUT

N1 N2 N3 N4 N5

N4 N5

NMX
C_RSV_1
IN1
IN_nd
OUT_nd_1
OUT1
C_RSV_1
OUT_nd_2
OUT2
OUTL_a
M_O_a
O_M_a
MIDL_a
I_M_a
M_I_a
INL
M_I_b
AREA_1
AREA_2
I_M_b
MIDL_b
O_M_b
M_O_b
OUTL_b

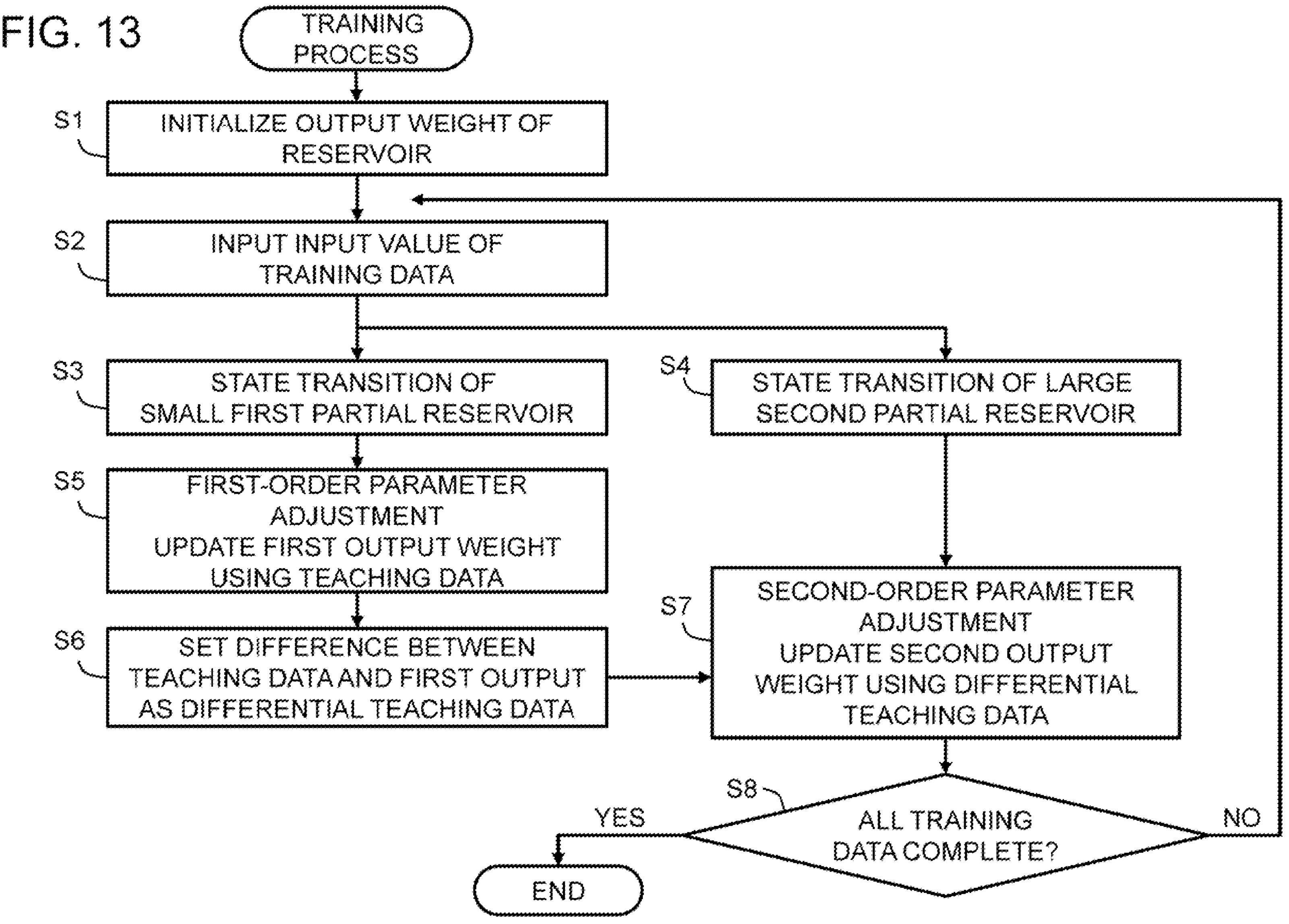
FIG. 13
TRAINING PROCESS
S1
INITIALIZE OUTPUT WEIGHT OF RESERVOIR
S2
INPUT INPUT VALUE OF TRAINING DATA
S3
STATE TRANSITION OF SMALL FIRST PARTIAL RESERVOIR
S4
STATE TRANSITION OF LARGE SECOND PARTIAL RESERVOIR
S5
FIRST-ORDER PARAMETER ADJUSTMENT
UPDATE FIRST OUTPUT WEIGHT USING TEACHING DATA
S6
SET DIFFERENCE BETWEEN TEACHING DATA AND FIRST OUTPUT AS DIFFERENTIAL TEACHING DATA
S7
SECOND-ORDER PARAMETER ADJUSTMENT
UPDATE SECOND OUTPUT WEIGHT USING DIFFERENTIAL TEACHING DATA
S8
ALL TRAINING DATA COMPLETE?
YES
NO
END

FIG. 14

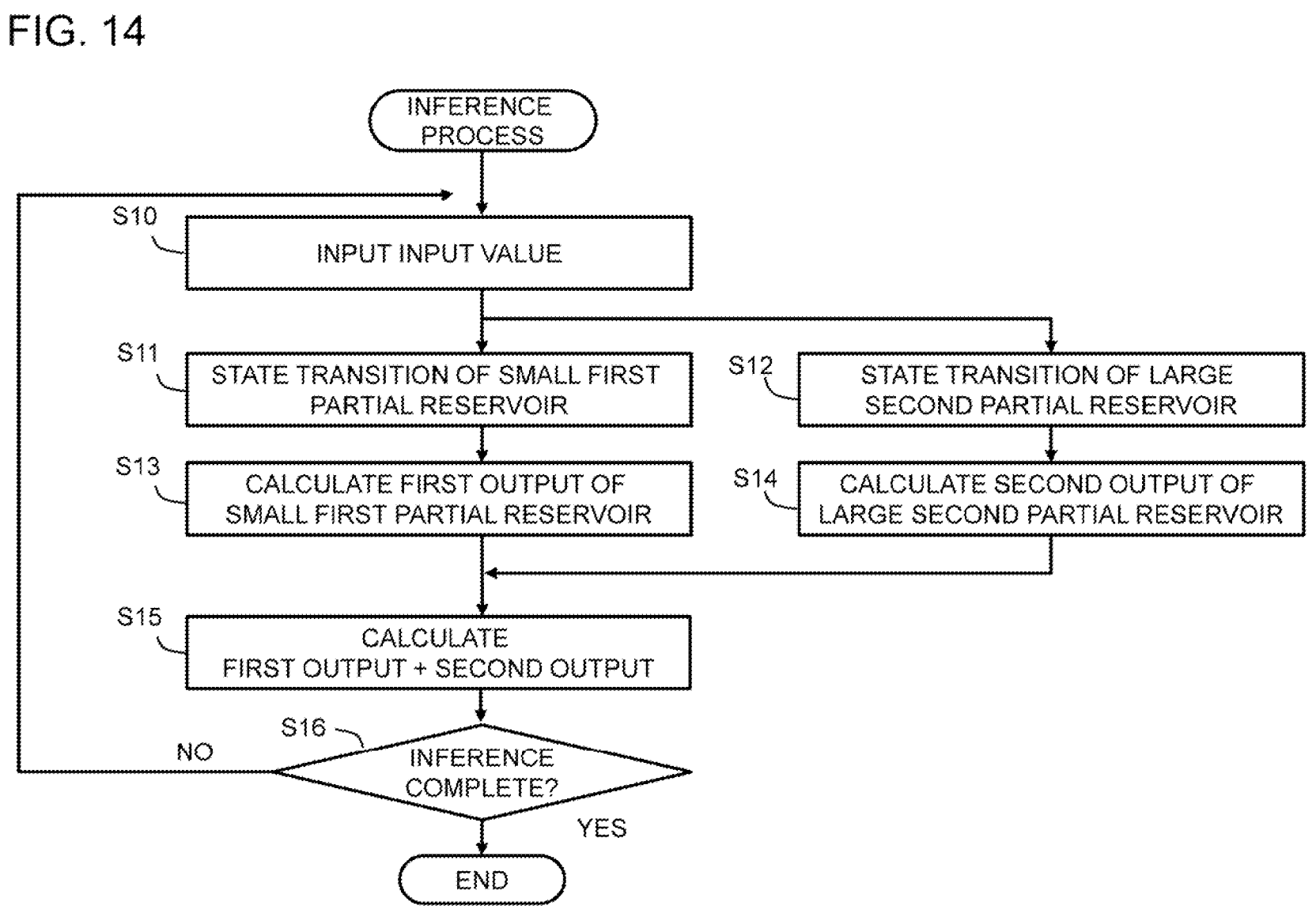

INFERENCE PROCESS

S10 INPUT INPUT VALUE

S11 STATE TRANSITION OF SMALL FIRST PARTIAL RESERVOIR

S12 STATE TRANSITION OF LARGE SECOND PARTIAL RESERVOIR

S13 CALCULATE FIRST OUTPUT OF SMALL FIRST PARTIAL RESERVOIR

S14 CALCULATE SECOND OUTPUT OF LARGE SECOND PARTIAL RESERVOIR

S15 CALCULATE FIRST OUTPUT + SECOND OUTPUT

S16 INFERENCE COMPLETE?

NO

YES

END

12
PROCESSOR
IN1, w1, w2, w3, OUT1, OUT2, OUT3
OUT_nd_3
M_RSV_3
IN_nd
M_RSV_2
OUT_nd_2
IN1
M_RSV_1
OUT_nd_1

INFORMATION PROCESSING SYSTEM HAVING AN INFORMATION PROCESSING DEVICE AND MULTIPLE PARTIAL RESERVOIRS THAT ARE TRAINED, INFORMATION PROCESSING DEVICE THAT TRAINS MULTIPLE PARTIAL RESERVOIRS, AND NON-TRANSITORY COMPUTER READABLE MEMORY MEDIUM THAT STORES INFORMATION PROCESSING PROGRAM FOR TRAINING MULTIPLE PARTIAL RESERVOIRS

CROSS-REFERENCE TO RELATED APPLICATION

This application is a continuation application of International Application Number PCT/JP2020/015877 filed on Apr. 8, 2020 and designated the U.S., the entire contents of which are incorporated herein by reference.

FIELD

The present invention relates to an information processing system, an information processing device, an information processing method, and an information processing program.

BACKGROUND

Neural networks are widely available as a type of machine learning model. In particular, deep neural networks (referred to hereinafter as DNNs) generated by deep learning are reported as exhibiting a high degree of performance in image processing and the like. DNNs are hierarchical neural networks. Further, a recurrent neural network (referred to hereinafter as an RNN), which is a type of DNN, is structured such that past states of neurons are input by feedback into the neurons themselves or other neurons. Feedback input is a past state that is dependent on past input history, and is suitable for a model that makes inferences based on the before/after relationships of time series input.

However, it is known that in an RNN, applying an error backpropagation method in order to optimize parameters during a training process of the DNN leads to an increase in the complexity of the calculation processing and is therefore unrealistic.

A reservoir computing employs a reservoir having the property of an RNN in which a past state can be reflected in the current state by means of recurrent feedback. In the reservoir computing, the weight (the output weight) of a fully connected layer constituted by the output nodes of the reservoir forming the RNN is updated during the training process without updating the weight in the reservoir. In so doing, the calculation load of the training process can be greatly reduced.

In reservoir computing, the neurons in the reservoir are nonlinear, and therefore it has been proposed to use a physical configuration having a nonlinear characteristic instead of a reservoir. The present invention can be applied to both a case in which a reservoir is realized by having a processor execute a computer program and a case in which a reservoir is realized by a physical reservoir.

CITATION LIST

Patent Literature

PTL1: Japanese Translation of PCT Application No. 2004-511866

PTL2: WO 2018/212201

PTL3: Japanese Patent Application Publication No. 2018-180701

Non-Patent Literature

NPL1: https://www.journal.ieice.org/bin/pdf_link.php?fname=k102_2_108&lang=J&year=2019.pdf Journal of the Institute of Electronics, Information and Communication Engineers, vol. 102, no. 2, 2019, "Concept of Reservoir Computing and its Recent Trends", TANAKA, Gouhei NPL2: https://www.nature.com/articles/s41467-017-02337-y.pdf As the size of the reservoir increases, the reservoir takes on the characteristics of a higher-dimensional function. However, when training is performed using a reservoir having the characteristics of a high-dimensional function, overtraining occurs, and as a result, the model enters an overfitted state.

SUMMARY

One aspect of the embodiment is an information processing system including: an information processing device including a memory and a processor that accesses the memory; and a reservoir configured to communicate with the information processing device, wherein the reservoir includes an input layer to which an input is applied, a first output layer configured to output a first readout value based on the input, a second output layer configured to output a second readout value based on the input, a first partial reservoir including the input layer and the first output layer, and a second partial reservoir including the input layer and the second output layer and in which the size between the input layer and the second output layer is larger than the size between the input layer and the first output layer of the first partial reservoir, and the processor executes processing for training the reservoir, the training processing including: first processing to calculate a third output weight that reduces a difference between a first output that is a first product sum value of a third readout value and a first output weight, the third readout value being output by the first output layer based on a first input, and teaching data corresponding to the first input; and second processing to calculate a fourth output weight that reduces a difference between a second output that is a second product sum value of a fourth readout value and a second output weight, the fourth readout value being output by the second output layer based on the first input, and differential teaching data that is a difference between a third product sum value of the third readout value and the third output weight and the teaching data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a view illustrating connections on the intersections of an adjacency matrix of a crossbar reservoir are classified into types.

FIG. 13 is a flowchart illustrating a training process executed on the reservoir computing models of the first and second embodiments.

FIG. 14 is a flowchart illustrating the processing of an inference process performed by the reservoir computing models according to the first and second embodiments.

DESCRIPTION OF EMBODIMENTS

Figure 1:
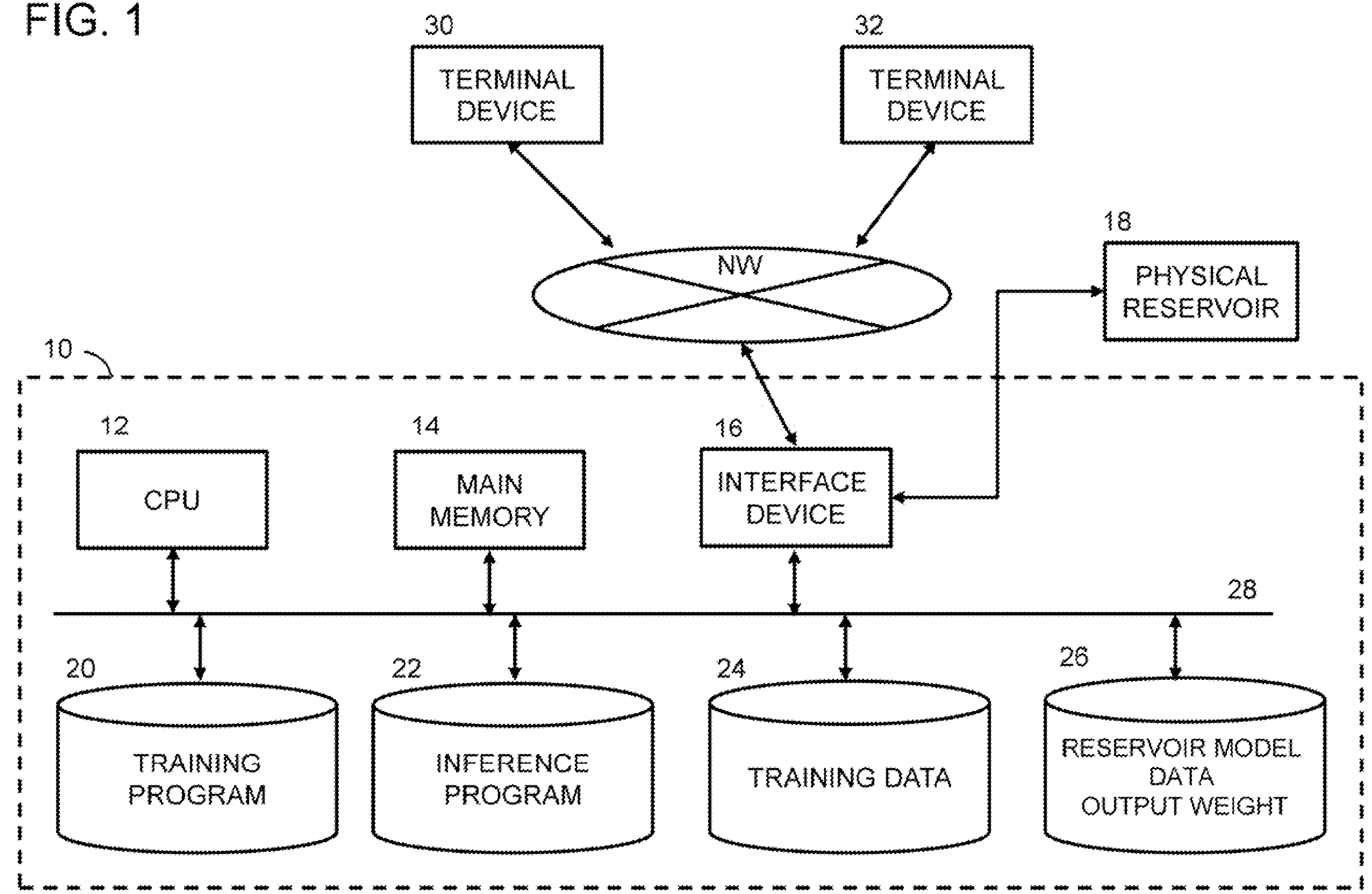
FIG. 1 is a schematic diagram of an information processing system for realizing a reservoir computing model according to the present embodiment.

FIG. 1 is a schematic diagram of an information processing system for realizing a reservoir computing model according to the present embodiment. An information processing device 10 is a computer such as a PC or an HPC, for example. The information processing device 10 includes a processor 12, a main memory 14 that is accessed by the processor, and an interface device 16 that communicates with the outside. Further, a training program 20 for a reservoir model, an inference program 22, training data 24 used in the training, and reservoir model data 26 including configuration data of the reservoir model and parameters such as output weights are stored in large-capacity auxiliary storage devices 20 to 26 of the information processing device 10. The processor 12 executes calculations of a training process and calculations of an inference process by executing the training program 20 and the inference program 22, which are read from the auxiliary storage devices and expanded in the main memory 14. Further, the processor 12 calculates transitions in the state of the reservoir in response to time series input by executing a calculation program included in the reservoir model data 26.

Furthermore, the information processing system of FIG. 1 may be provided with a physical reservoir 18. Thus, the processor 12 refers to physical changes in the physical reservoir 18 via the interface 16 instead of calculating the state transitions of the reservoir by referring to the reservoir model data 26. In this case, in the training process, rather than calculating the state transitions of the reservoir, the processor 12 instead acquires the output of the physical reservoir 18 and updates the output weights by calculation so as to reduce an error between teaching data and the output.

The information processing device 10 is accessed from a plurality of terminal devices 30, 32 via a network NW. In response to a request from the terminal devices for training processing or inference processing, the processor 12 executes calculations of a training model or an inference model and thereby executes calculations of the requested training processing or inference processing.

Figure 2:
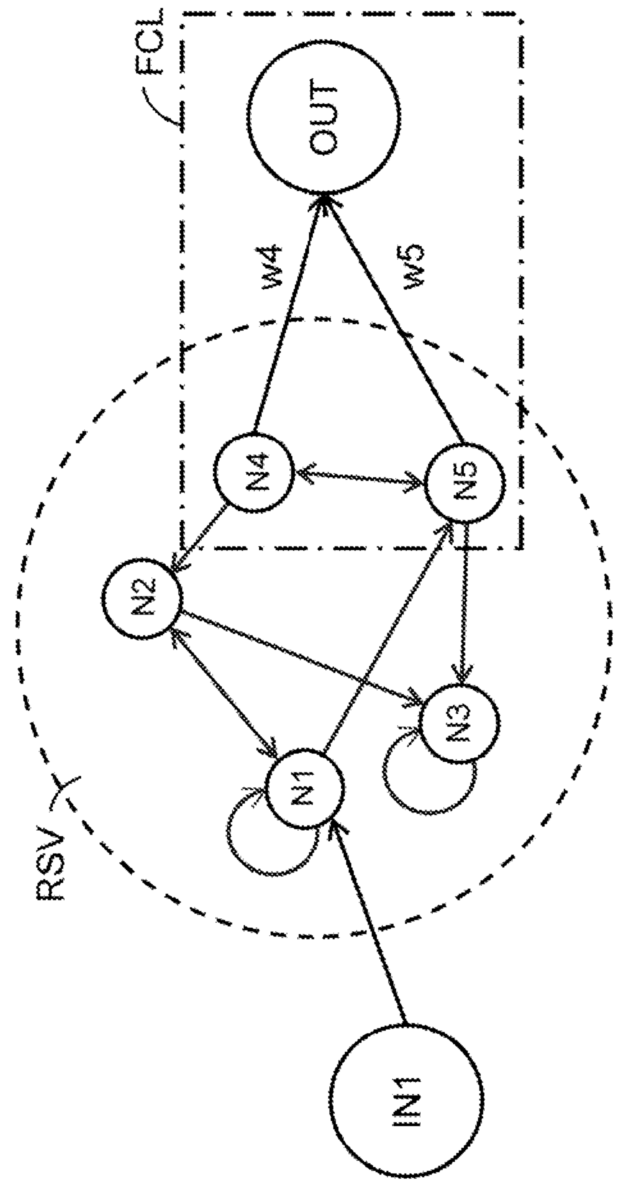
FIG. 2 is a view depicting an example of a network of a reservoir computing model.

FIG. 2 is a view depicting an example of a network of a reservoir computing model. Neurons of the reservoir will be referred to hereinafter as nodes. A reservoir RSV includes nodes N1 to N5 and inter-node connections and node self-connections. The connections are known as edges. Further, the connections each have a direction indicated by an arrow and a weight corresponding to the direction. In the figure, the arrows inside the reservoir RSV denote inter-node connections or node self-connections. For example, the nodes N1 and N3 are self-connected. A bidirectional connection exists between the node N1 and the node N2. A single-direction connection from the node N2 to the node N3 exists between the nodes N2 and N3.

The inter-node connections or self-connections and the weights of the respective connections in the reservoir RSV are determined prior to training either at random or in accordance with a predetermined rule. For example, the predetermined rule means connection probabilities between the nodes and the weight distribution of the connections as parameters.

When an input is applied to the node N1 from an input terminal IN1 at a time t, the states of the nodes N1 to N5 transition based on the input and the states of the nodes at a time prior to the time t. The states of the nodes N4 and N5 are output, whereupon an activation calculated based on the outputs (the readouts) of the nodes N4 and N5 and output weights w4, w5 is input into an output terminal OUT. The nodes N4 and N5, the connections of the output weights w4, w5, and the output terminal OUT constitute a fully connected layer FCL. Thus, the reservoir computing model includes the reservoir RSV and a readout portion forming the fully connected layer FCL for the output of the reservoir.

In the reservoir RSV of FIG. 2, the node N1 corresponds to an input layer to which the input is applied, and the nodes N4 and N5 correspond to an output layer from which the states thereof are read as output. The nodes N2 and N3 between the node N1 of the input layer and the nodes N4, N5 of the output layer correspond to an middle layer.

In the training process of the reservoir computing model, the output weight of the fully connected layer FCL serving as the readout portion is updated in accordance with the gradient method while keeping the inter-node connections and node self-connections in the reservoir fixed. In other words, the output weights w4, w5 are updated by the gradient method so as to minimize the error between the teaching data and the output of the output node OUT. The weights of the connections in the reservoir are not updated by the gradient method during the training process. Hence, in the training process of the reservoir computing model, the number of output weights that are adjusted by being updated in the gradient method is small, and therefore the training processing is simplified. As a result, the training process is completed with a smaller amount of training data.

With the reservoir computing model, either the reservoir RSV is realized by a physically configured physical reservoir, or the state transitions of the reservoir is calculated by calculations performed by a computer program. An example of a crossbar reservoir that uses nonlinear elements will be described below as an example of a physical reservoir.

Figure 3:
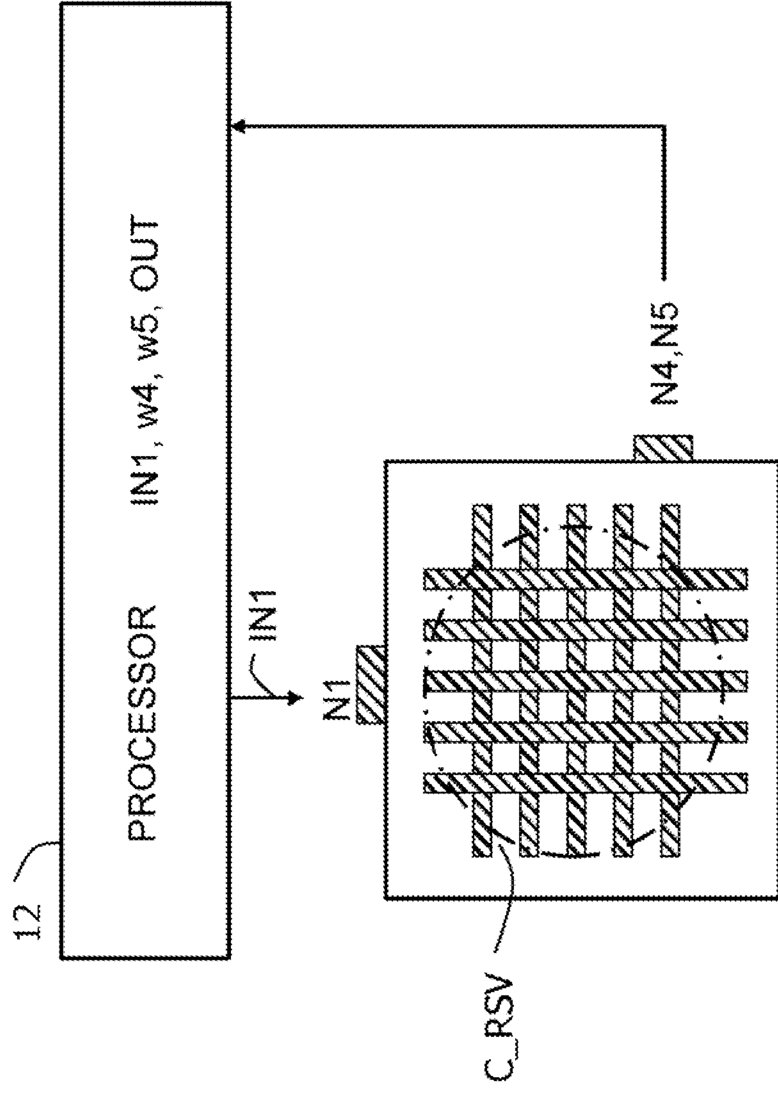
FIG. 3 is a view depicting an information processing system using a crossbar reservoir, which is a type of physical reservoir, as a reservoir computing model.

FIG. 3 is a view depicting an information processing system using a crossbar reservoir, which is a type of physical reservoir, as a reservoir computing model. The information processing system of the reservoir computing model depicted in FIG. 3 includes an information processing device 10 having a processor, and a crossbar reservoir C_RSV serving as a physical reservoir. The crossbar reservoir C_RSV includes column lines corresponding to node inputs, and row lines corresponding to node outputs, and although not illustrated in the figure, physical circuits such as memristors, CR circuits, or other analog circuits having nonlinearity are provided between the column lines and row lines.

In terms of the reservoir computing model of FIG. 2, the input IN1 is supplied to the input of the node N1 of the input layer in the crossbar reservoir C_RSV from the processor, and the outputs (the readout values) of the nodes N4, N5 of the output layer are output to the processor. The processor executes the calculations of the training process and the inference process on the fully connected layer serving as the readout portion by executing a computer program.

Hence, in the reservoir computing model, the processor that executes the training program supplies the input IN1, which is constituted by training data, to the node N1 serving as the input layer of the crossbar reservoir C_RSV, and in response thereto, the state of the crossbar reservoir C_RSV transitions from a past state to the current state. The processor then receives input of output indicating the states of the nodes N4, N5 serving as the output layer of the crossbar reservoir C_RSV, and by executing the training program updates the output weights W4, W5 of the fully connected layer FCL serving as the readout portion by means of the gradient method. By repeating this training process, the output weights are optimized, whereby a reservoir computing model that generates output that is identical or close to the teaching of the training data is generated.

Figure 4:
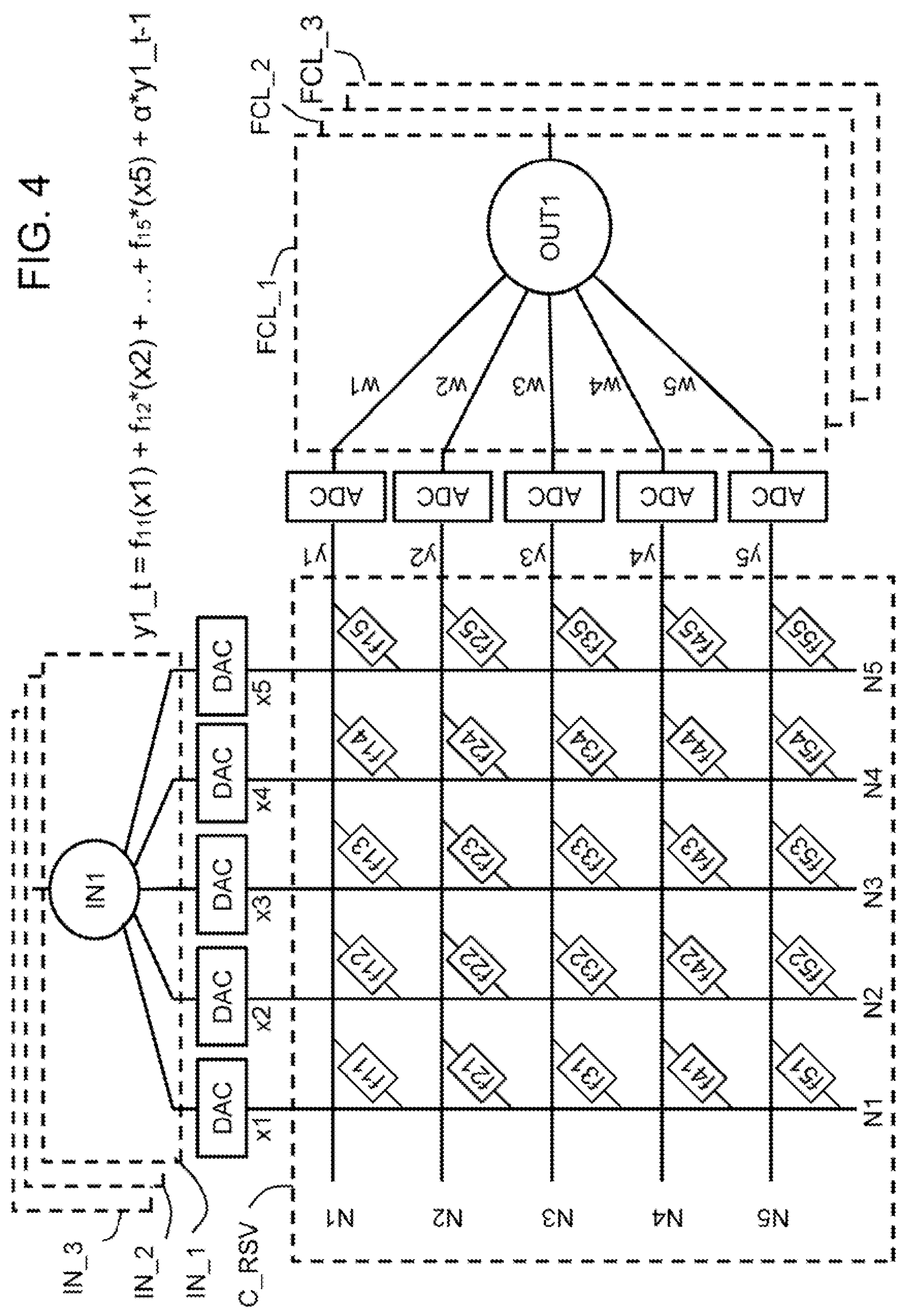
FIG. 4 is a view depicting an example of a crossbar reservoir and an example of a fully connected layer serving as the readout portion.

FIG. 4 is a view depicting an example of a crossbar reservoir and an example of a fully connected layer serving as the readout portion. The crossbar reservoir C_RSV includes, in relation to the five nodes N1 to N5 illustrated in FIG. 2, five column lines (vertical lines) N1 to N5 corresponding to the inputs of the nodes, five row lines (horizontal lines) N1 to N5 corresponding to the outputs of the nodes, and 25 connection circuits f11 to f55 arranged at the intersections between the column lines and the row lines. The connection circuits f11 to f55 are memristors, for example.

In the crossbar reservoir C_RSV of FIG. 4, the connection circuits f11 to f55 are provided between all the five column lines and five row lines, but the connection circuits may be provided only between certain column lines and row lines. In the reservoir RSV of FIG. 2, for example, inter-node connections and node self-connections are provided between and in only some of the nodes respectively. A connection circuit between the column line and the row line of the same node corresponds to a node self-connection. Further, a connection circuit between the column line and the row line of different nodes corresponds to a single direction inter-node connection from the node of the column line in the direction of the node of the row line. The connection circuits correspond to the weights of the connections in the reservoir of FIG. 2.

In the example of FIG. 4, analog signals X1 to X5 acquired by converting digital signals supplied from the input terminal IN1 of an input portion IN_1 using a DAC (digital-analog converter) are input into the five column lines corresponding to the inputs of the nodes. This occurs similarly in input portions IN_2, IN_3. Note that when inputs are applied to some of the nodes in the reservoir, the analog signals acquired by converting the digital signals of the input terminal IN1 using a DAC are applied to the inputs of some of the nodes.

Meanwhile, analog signals y1 to y5 of the five row lines corresponding to the outputs of the nodes are converted using an ADC (analog-digital converter) and output to a fully connected layer FCL_1, whereupon a digital signal of a product sum value generated by the fully connected layer FCL_1 is output to an output node OUT1 as an activation. The product sum value is as follows.

$$OUT1=y1\times w1+y2\times w2+y3\times w3+y4\times w4+y5\times w5$$

This applies likewise to the other fully connected layers FCL_2, FCL_3. Note that when the outputs are output from some of the nodes in the reservoir, the outputs of some of the nodes of the five row lines are output to the fully connected layer.

In the case of the reservoir illustrated in FIG. 2, of the 25 connection circuits, f11, f12, f21, f24, f32, f33, f35, f45, f51, and f54 have finite values, while the remainder are infinite, or in other words unconnected. In this type of crossbar reservoir C_RSV, when the input x1, among time series inputs, is applied to the node N1 of the input layer at a time t1, the states of all the nodes N1 to N5 transition to the outputs y1 to y5 as illustrated in the following formula.

$$y1\_t1=\{f11(x1)+f12(x2)\}+a*y1\_t0$$

$$y2\_t1=\{f21(x1)+f24(x4)\}+a*y2\_t0$$

$$y3\_t1=\{f32(x2)+f33(x3)+f35(x5)\}+a*y3\_t0$$

$$y4\_t1=\{f45(x5)\}+a*y4\_t0$$

$$y5\_t1=\{f51(x1)+f54(x4)\}+a*y5\_t0$$

Here, f11($x$) to f55($x$) are functions for determining the values to be output to the outputs y of the nodes in relation to the inputs x of the nodes. Further, a time t0 is a time one interval before the time t1 that is the input time, y1_t1 is the state at the time t1, and y1_t0 is the state at the time t0. Furthermore, a corresponds to the decay rate of the state of a node. When the connection circuits are memristors, the characteristic of the functions f11($x$) to f55($x$) changes to a nonlinear characteristic based on the input at a certain time.

As described above, in a crossbar reservoir constituting a physical reservoir, each node successively transitions to a new state in response to time series input while maintaining a state based on past input. Thus, the input is non-linearly transformed by the crossbar reservoir C_RSV, and the state following transformation is mapped to a high-dimensional feature space. Meanwhile the states of the nodes on the output layer of the crossbar reservoir C_RSV are linearly connected in the fully connected layer FCL, whereupon the output OUT is output.

Here, an adjacency matrix illustrating the weights of the inter-node connections and node self-connections of the crossbar reservoir C_RSV on a matrix will be described. By using an adjacency matrix, the configuration of a crossbar reservoir having nodes forming the input layer, middle layer, and output layer of the crossbar reservoir as well as inter-node connections and node self-connections can be more easily understood.

Figure 5:
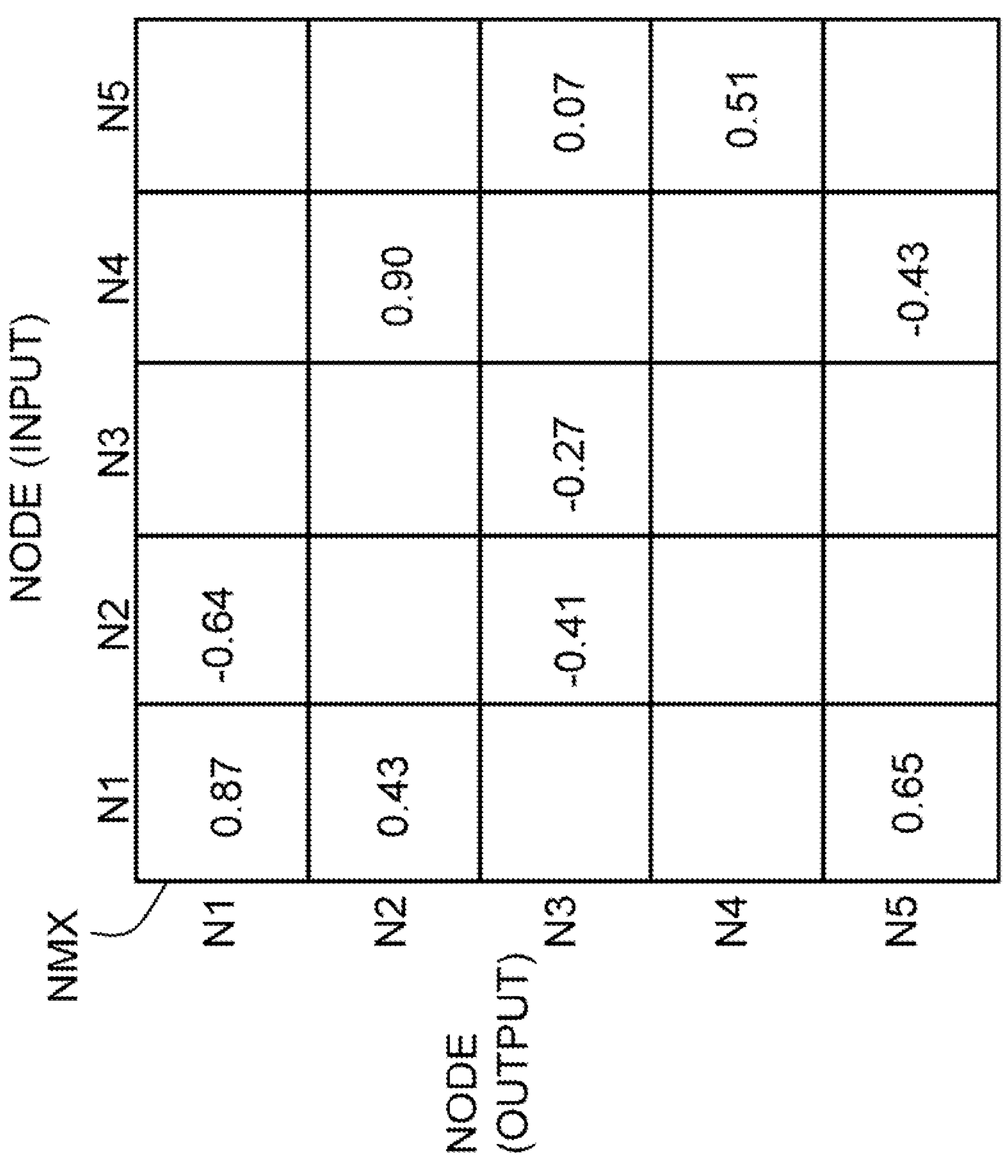
FIG. 5 is a view depicting an example of an adjacency matrix of a crossbar reservoir corresponding to the example of FIG. 2.

FIG. 5 is a view depicting an example of an adjacency matrix of a crossbar reservoir corresponding to the example of FIG. 2. On the adjacency matrix, the weights of the inter-node connections and the weights of the node self-connections are indicated in intersection positions between columns corresponding to the inputs of the nodes N1 to N5 and rows corresponding to the outputs of the nodes N1 to N5. For example, the weight of the self-connection of the node N1 is indicated in the intersection position between the column of the node N1 and the row of the node N1. Meanwhile, the weight of the inter-node connection from the node N1 to the node N2 is indicated in the intersection position between the column of the node N1 and the row of the node N2. Conversely, the weight of the inter-node connection from the node N2 to the node N1 is indicated in the intersection position between the column of the node N2 and the row of the node N1. Hence, in FIG. 5, weights are indicated respectively in the positions of the functions f11, f12, f21, f24, f32, f33, f35, f45, f51, and f54 depicted in the above formula.

Figure 6:
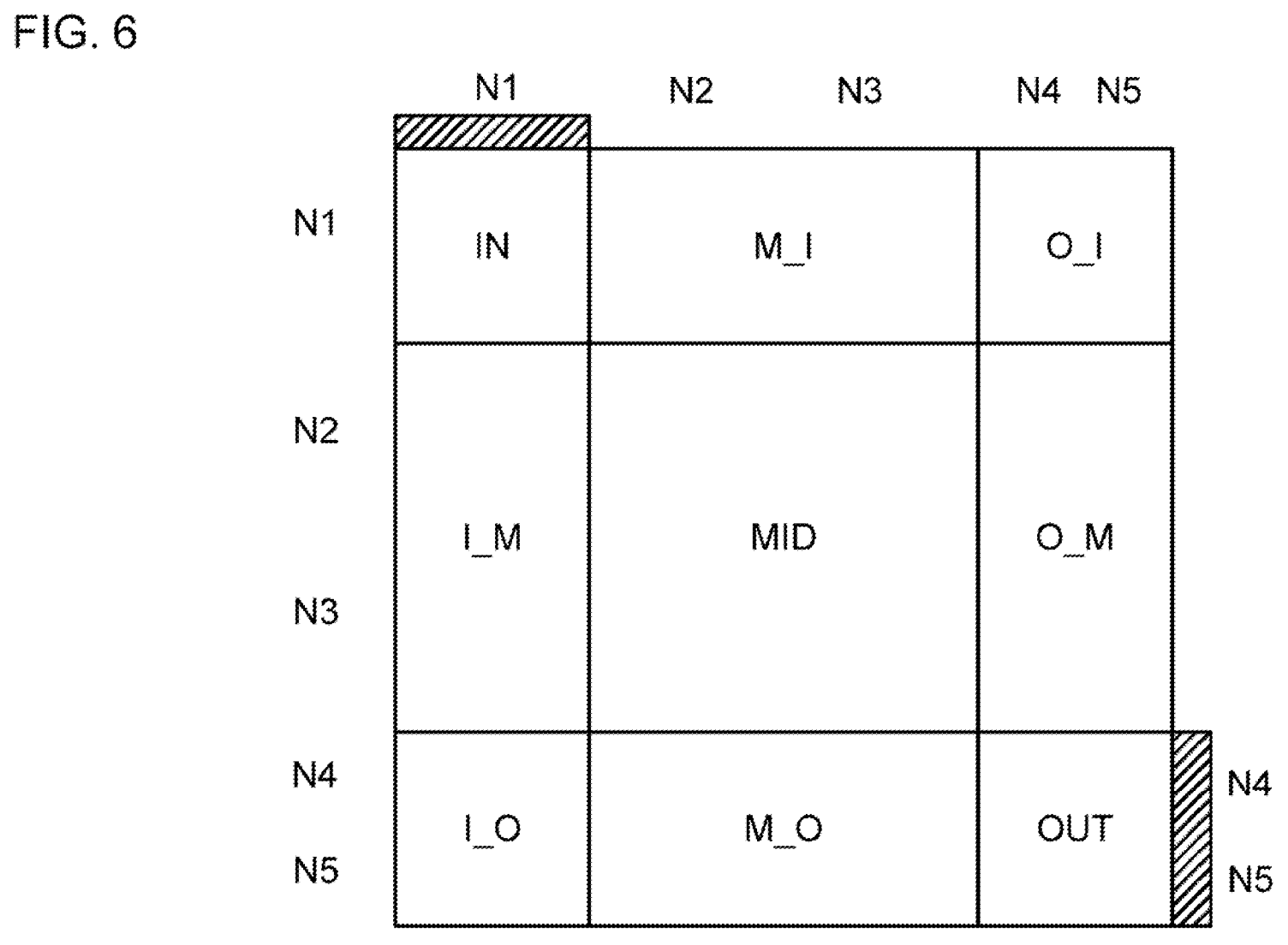

FIG. 6 is a view illustrating connections on the intersections of an adjacency matrix of a crossbar reservoir are classified into types. In the example of a reservoir illustrated in FIG. 2, the node N1 is an input layer INL, the nodes N4, N5 are an output layer OUTL, and the nodes N2, N3 between the input layer and the output layer are a middle layer MIDL. On an adjacency matrix, therefore, the intersection position between the column and the row of the node N1 indicates the input layer INL, the intersection positions between the column and the row of the nodes N4, N5 indicate the output layer OUTL, and the intersection positions between the column and the row of the nodes N2, N3 indicate the middle layer MIDL. The input layer INL, the middle layer MIDL, and the output layer OUTL form a square matrix having the number of nodes constituting the respective layers, and correspond to node self-connection areas.

Further, intersection positions between the column of the node N1 and the row of N2, N3 indicate an inter-node connection area I_M from the input layer to the middle layer, intersection positions between the column of the nodes N2, N3 and the row of the nodes N4, N5 indicate an inter-node connection area M_O from the middle layer to the output layer, intersection positions between the column of the nodes N2, N3 and the row of the node N1 indicate an inter-node connection area M_I from the middle layer to the input layer, and intersection positions between the column of the nodes N4, N5 and the row of the nodes N2, N3 indicates an inter-node connection area O_M from the output layer to the middle layer, and furthermore, intersection positions between the column of the node N1 and the row of the nodes N4, N5 indicate an inter-node connection area I_O from the input layer to the output layer, and intersection positions between the column of the nodes N4, N5 and the row of the node N1 indicate an inter-node connection area O_I from the output layer to the input layer.

Figure 7:
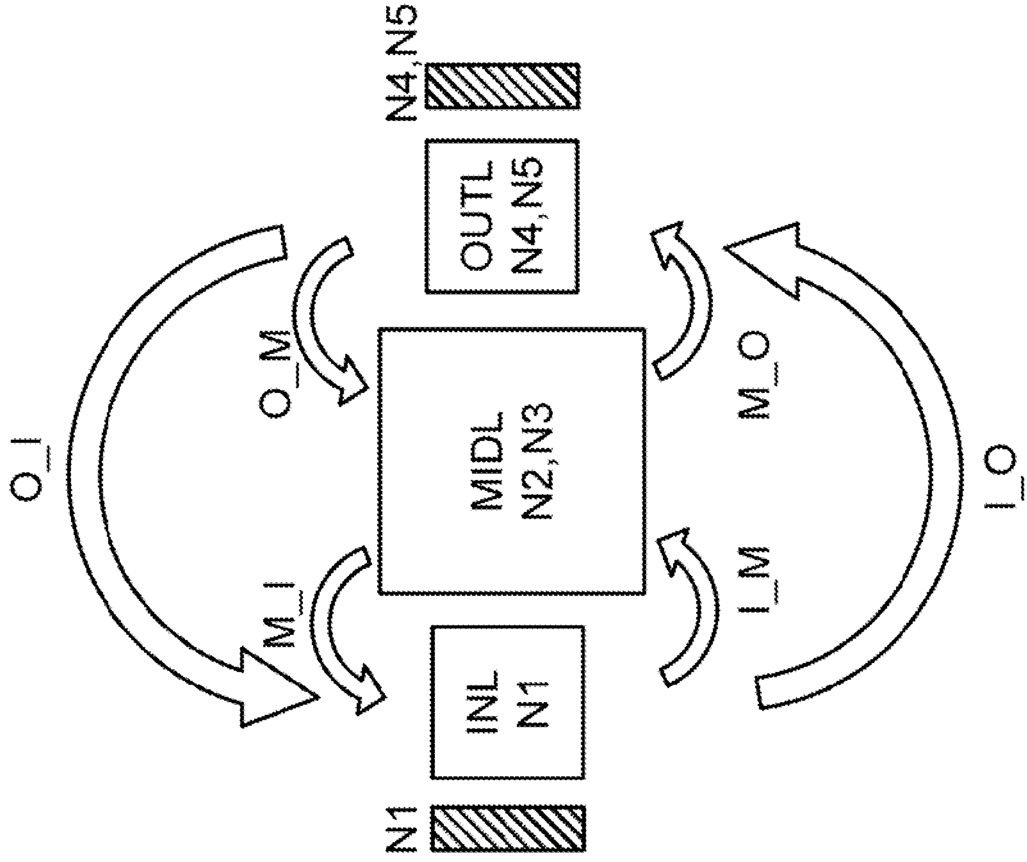
FIG. 7 is a view depicting relationships between the nine areas illustrated on the adjacency matrix of FIG. 6.

FIG. 7 is a view depicting relationships between the nine areas illustrated on the adjacency matrix of FIG. 6. FIG. 7 illustrates relationships between the input layer INL, middle layer MIDL, and output layer OUTL and the inter-node connection areas I_M, M_O, I_O, O_M, M_I, and I_O therebetween.

Hence, referring to the crossbar reservoir configuration and the adjacency matrix illustrated in FIGS. 4, 5, 6, and 7, transitions in the states of the nodes in response to time series input will now be described in relation to the reservoir RSV of FIG. 2. Note that in the following description, it is assumed that a connection from the node N1 to the node N5 of the reservoir RSV illustrated in FIG. 2 is set to be unconnected. Accordingly, the inter-node connection areas O_I and I_O in FIG. 7 are unconnected.

When input is applied to the node N1 at a time t1, (1) the node N1 of the input layer INL transitions to the sum of change in N1 caused by the input x1 at the time t1, change in N1 based on the node state x1 of the input layer INL at the time t0 and the self-connection thereof, and change in N1 based on the node states x2, x3 of the middle layer MIDL at the time t0 and the inter-node connection M_I (N2, N3 to N1) of the area M_I of N1.

(2) The nodes N2, N3 of the middle layer MIDL transition to the sum of change in N2, N3 based on the input x1 to N1 at the time t1 and the inter-node connection (N1 to N2, N3) of the area I_M, change in N2, N3 based on the node states x2, x3 of the middle layer MIDL at the time t0 and the self-connection of the middle layer, and change in N2, N3 based on the node states x4, x5 of the output layer OUTL at the time t0 and the inter-node connection (N4, N5 to N2, N3) of the area O_M.

(3) The nodes N4, N5 of the output layer OUTL transition to the sum of change in N4, N5 based on the node states x2, x3 of the middle layer MIDL at the time t0 and the inter-node connection (N2, N3 to N4, N5) of the area M_O, and change in N4, N5 based on the node states x4, x5 of the output layer OUTL at the time t0 and the self-connection of the output layer.

As described above, the input layer INL, the middle layer MIDL, and the output layer OUTL of the crossbar reservoir form square-shaped areas within an adjacency matrix and each have a self-connection. Further, the inter-node connections between the layers are positioned in the areas I_M, M_O, O_M, M_I, I_O, and O_I of the adjacency matrix.

Reservoir Computing Model According to this Embodiment

As the size of the reservoir increases, the reservoir takes on the characteristics of a higher-dimensional function. However, when training is performed using training data on a reservoir having the characteristics of a high-dimensional function, overtraining occurs, and as a result, the model enters an overfitted state.

Figure 8:
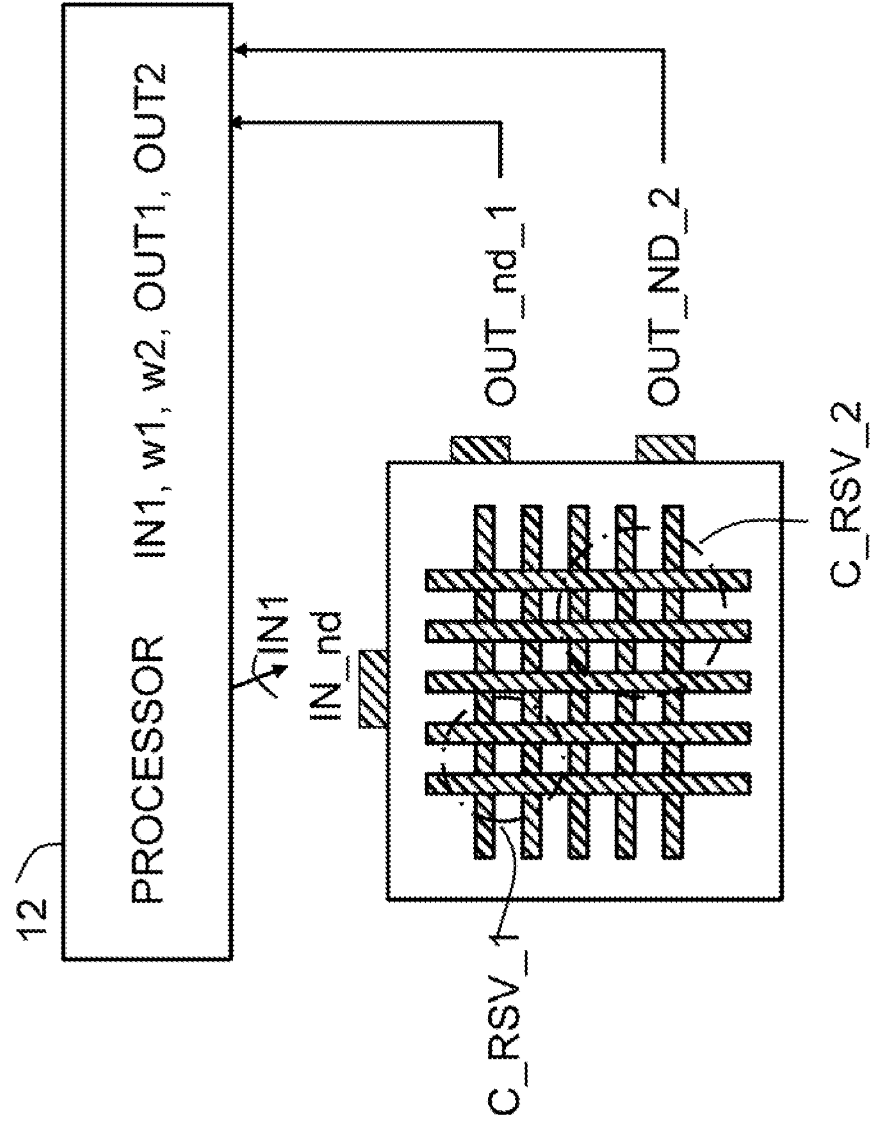
FIG. 8 is a view depicting a reservoir computing model according to a first embodiment.

FIG. 8 is a view depicting a reservoir computing model according to a first embodiment. The model of FIG. 8 is an information processing system including the crossbar reservoir C_RSV, which serves as an example of a physical reservoir, and the information processing device 10.

The crossbar reservoir C_RSV includes a first partial reservoir C_RSV_1, and a second partial reservoir C_RSV_2 in which the size between the input layer and the output layer is larger than in the first partial reservoir, whereby the second partial reservoir C_RSV_2 has a function characteristic of a higher dimension than the first partial reservoir C_RSV_1. The first partial reservoir C_RSV_1 and the second partial reservoir C_RSV_2 share a common input node IN_nd, have respective output nodes OUT_nd_1, OUT_nd_2, and have respective middle layer nodes between the common input node and the respective output nodes. The common input node IN_nd constitutes a common input layer, and the output nodes OUT_nd_1, OUT_nd_2 constitute respective output layers. The configuration of the crossbar reservoir C_RSV will be described below using an adjacency matrix. The size of the reservoir corresponds to the number of nodes on the middle layer, for example.

Readout values from the output nodes OUT_nd_1, OUT_nd_2 of the respective output layers are output to the information processing device 10 illustrated in FIG. 1, whereupon the processor 12 calculates a product sum value of the linear connection of the readout values and the output weights so as to generate two outputs OUT1, OUT2, and calculates the sum of the two outputs as the output of the crossbar reservoir C_RSV. Further, the processor 12 optimizes the output weights using training data in a training process, the procedures of which will be described below.

Figure 9:
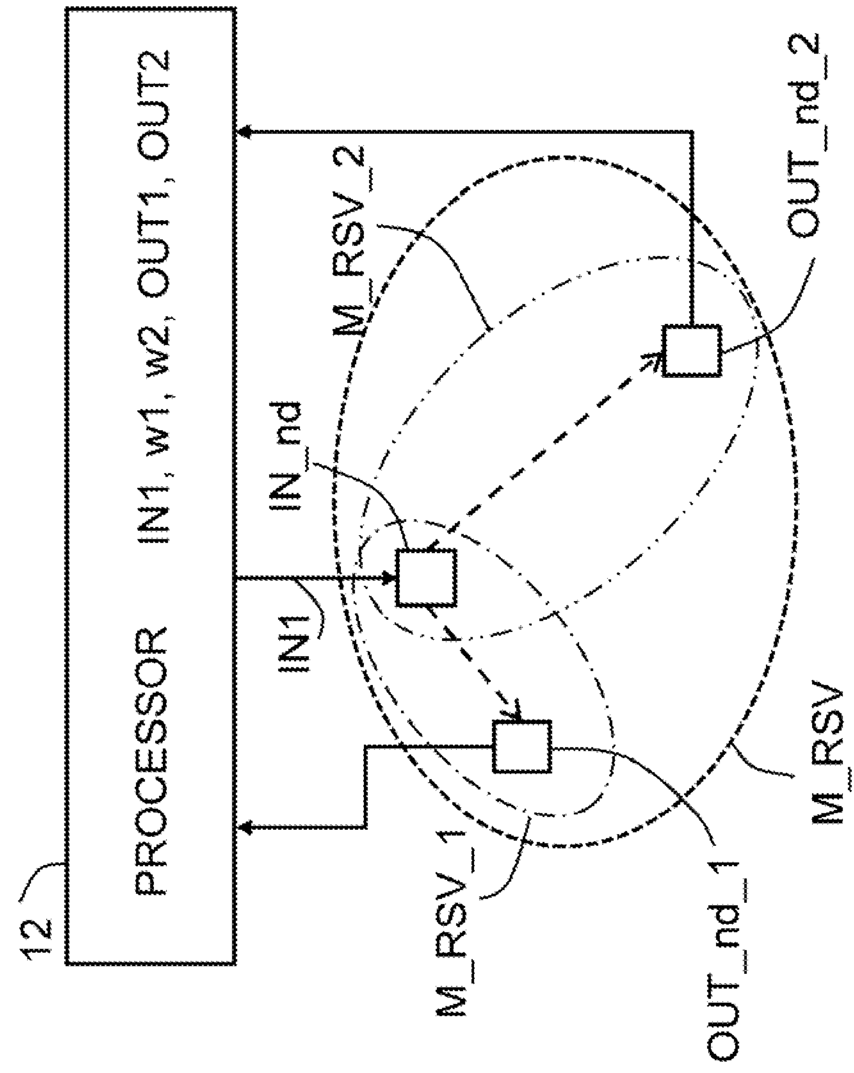
FIG. 9 is a view depicting a reservoir computing model according to a second embodiment.

FIG. 9 is a view depicting a reservoir computing model according to a second embodiment. The model of FIG. 9 is an information processing system including a material reservoir M_RSV that uses the nonlinearity of a material and is an example of a physical reservoir, and the information processing device 10. Examples of material reservoirs include, for example, a mass of material having electrical non-linearity, a mass of material having optical non-linearity, and so on.

The material reservoir M_RSV is a mass of material. When the input node IN_nd of the input layer into which the input IN1 is input and the output node OUT_nd of the output layer from which the readout value is extracted are set in arbitrary positions of the material, the material between the nodes of the input layer and the output layer constitute virtual nodes of a middle layer. Likewise in the second embodiment, similarly to the first embodiment, the material reservoir M_RSV includes a first partial reservoir M_RSV_1 and a second partial reservoir M_RSV_2 in which the size between the input layer and the output layer is larger than in the first partial reservoir M_RSV_1, whereby the second partial reservoir M_RSV_2 has a function characteristic of a higher dimension than the first partial reservoir M_RSV_1. The first partial reservoir M_RSV_1 and the second partial reservoir M_RSV_2 include a partially overlapping area, and the input node IN_nd of the common input layer is provided therein. Further, the nodes OUT_nd_1, OUT_nd_2 of the output layers are provided respectively in the first partial reservoir M_RSV_1 and the second partial reservoir M_RSV_2. The size of the material reservoir M_RSV corresponds to the distance between the input node IN_nd and the output node OUT_nd, for example.

Similarly to the first embodiment, readout values from the output nodes OUT_nd_1, OUT_nd_2 of the respective output layers are output to the information processing device 10, whereupon the processor calculates a product sum value of the linear connections of the readout values and the output weights so as to generate the two outputs OUT1, OUT2, and calculates the sum of the two outputs as the output of the material reservoir M_RSV. The processor also optimizes the output weights using training data in a training process, the procedures of which will be described below.

Figure 10:
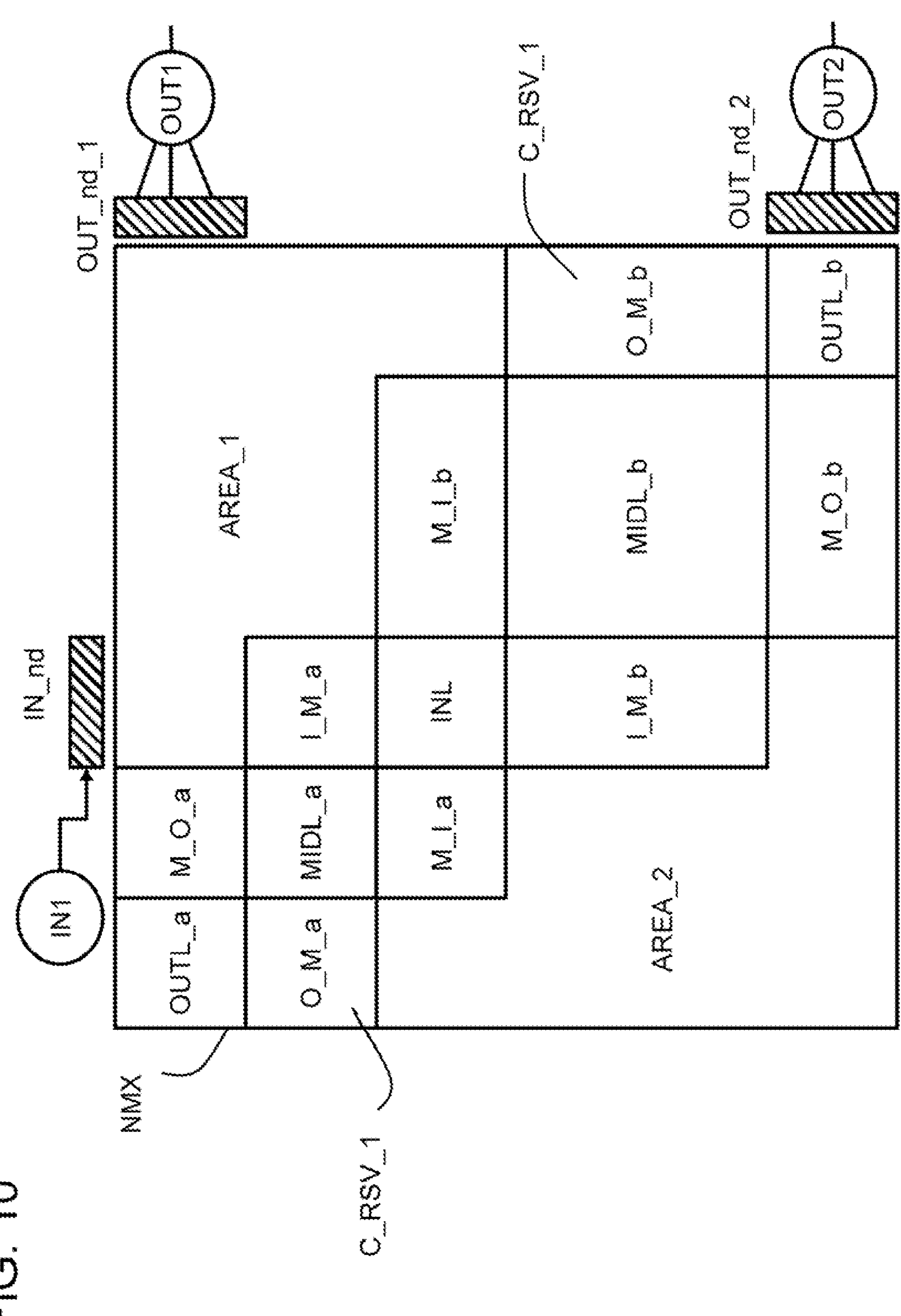
FIG. 10 is a view depicting areas of an adjacency matrix of the reservoir computing model according to the first embodiment.
Figure 11:
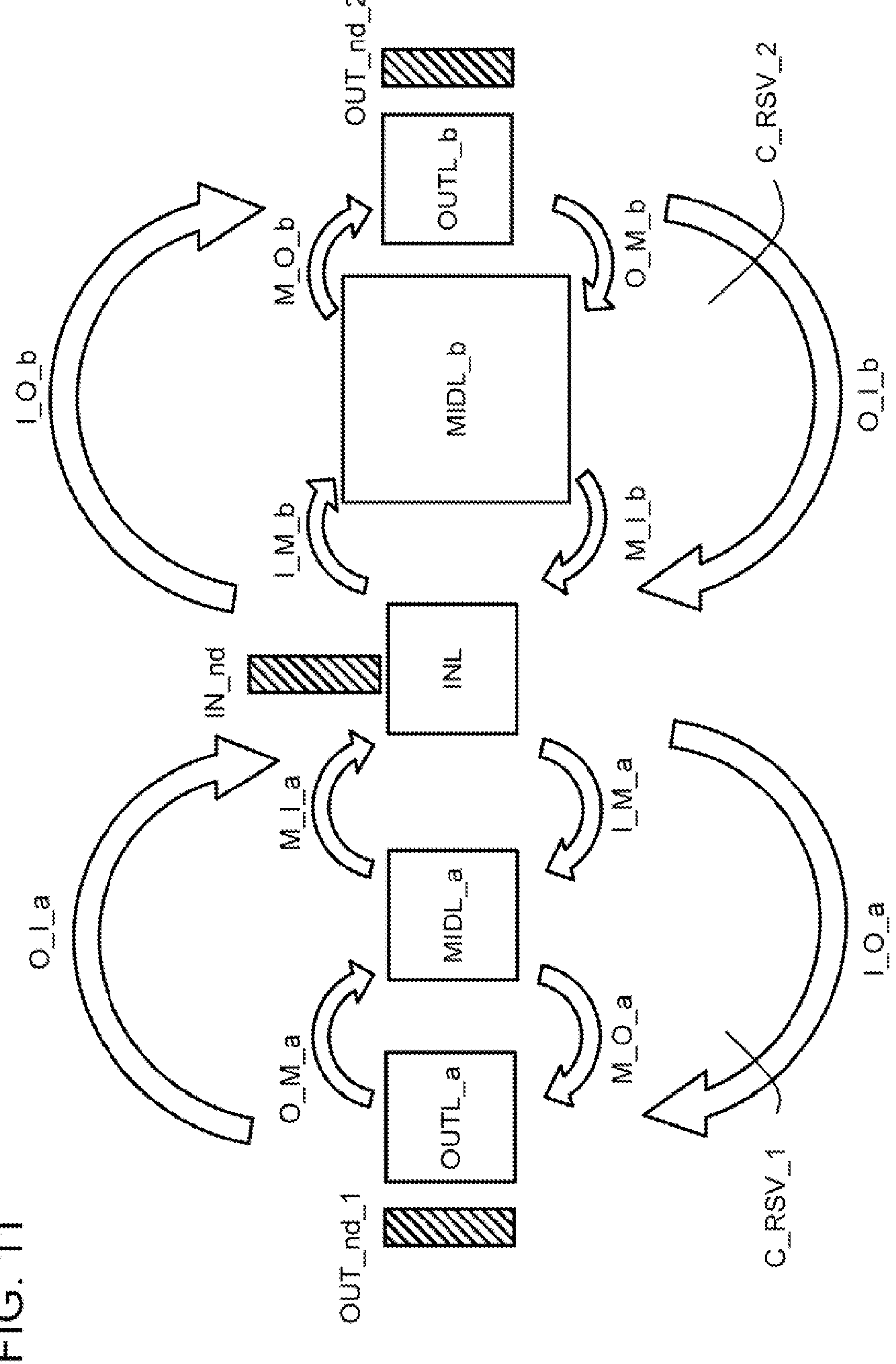
FIG. 11 is a view depicting relationships between the nine areas illustrated on the adjacency matrix of FIG. 10.

FIG. 10 is a view depicting areas of an adjacency matrix of the reservoir computing model according to the first embodiment. As depicted in FIG. 8, the crossbar reservoir C_RSV that is an example of a physical reservoir includes the first partial reservoir C_RSV_1 and the larger second partial reservoir C_RSV_2. Further, FIG. 11 is a view depicting relationships between the nine areas illustrated on the adjacency matrix of FIG. 10.

The first partial reservoir C_RSV_1 includes the input layer INL having the input node IN_nd, a first output layer OUTL_a having the first output node OUT_nd_1, and a first middle layer MIDL_a having a first group of intermediate nodes therebetween. Similarly to FIGS. 6 and 7, the first partial reservoir C_RSV_1 includes an area I_M_a that includes an inter-node connection from the node of the input layer INL to the nodes of the first middle layer MIDL_a, and an area M_O_a that includes an inter-node connection from the nodes of the first middle layer MIDL_a to the node of the first output layer OUTL_a. Similarly, the first partial reservoir C_RSV_1 includes an area O_M_a that includes an inter-node connection from the node of the output layer OUTL to the nodes of the first middle layer MIDL_a, and an area M_I_a that includes an inter-node connection from the nodes of the first middle layer MIDL_a to the node of the input layer INL. Note that in areas I_O_a and O_I_a within areas AREA_1 and AREA_2 of FIG. 10, the inter-node connections are unconnected. The reason for this is that in the case of a physical reservoir, the distance between the input node group and the output node group is typically long, and therefore these inter-node connections are unconnected.

The product sum value of the readout value of the first output node OUT_nd_1 of the first output layer and the output weight forms the first output OUT1. The output weight of this fully connected layer is updated to an optimum value in the training process.

The second partial reservoir C_RSV_2 includes the input layer INL having the input node IN_nd, a second output layer OUTL_b having the second output node OUT_nd_2, and a second middle layer MIDL_b having a second group of intermediate nodes therebetween. Similarly to FIGS. 6 and 7, the second partial reservoir C_RSV_2 includes an area I_M_b that includes an inter-node connection from the node of the input layer INL to the nodes of the second middle layer MIDL_b, and an area M_O_b that includes an inter-node connection from the nodes of the second middle layer MIDL_b to the node of the second output layer OUTL_b. Similarly, the second partial reservoir C_RSV_2 includes an area O_M_b that includes an inter-node connection from the node of the output layer OUTL to the nodes of the second middle layer MIDL_b, and an area M_I_b that includes an inter-node connection from the nodes of the second middle layer MIDL_b to the node of the input layer INL. Note that in areas I_O_b and O_I_b within the areas AREA_1 and AREA_2 of FIG. 10, the inter-node connections are unconnected. The reason for this is as described above.

The product sum value of the readout value of the second output node OUT_nd_2 of the second output layer and the output weight forms the second output OUT2. The output weight of this fully connected layer is updated to an optimum value in the training process.

Figure 12:
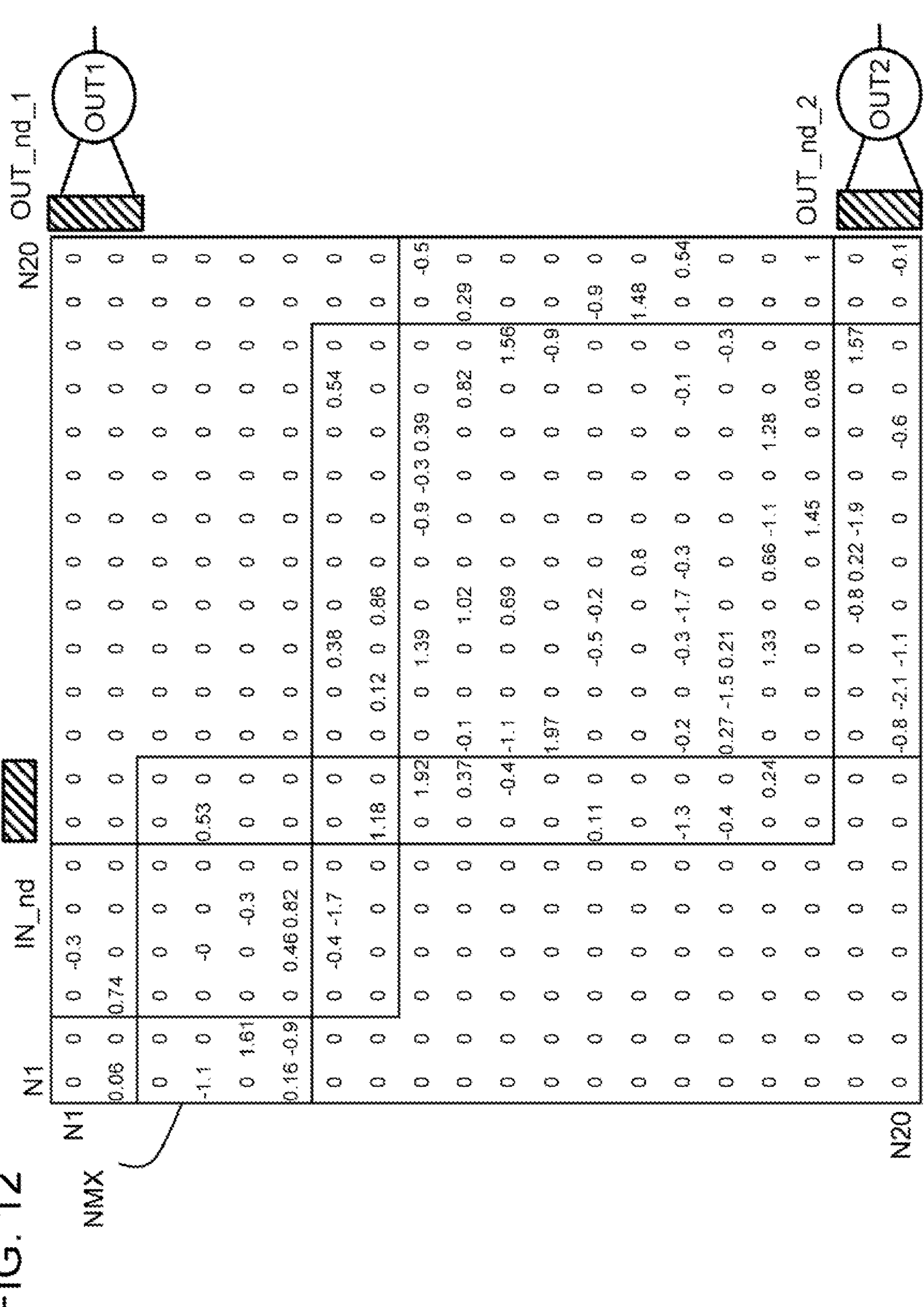
FIG. 12 is a view depicting a specific example of an adjacency matrix. This adjacency matrix NMX is a 20×20 matrix and therefore an adjacency matrix corresponding to a crossbar reservoir with 20 nodes.

FIG. 12 is a view depicting a specific example of an adjacency matrix. This adjacency matrix NMX is a 20×20 matrix and therefore an adjacency matrix corresponding to a crossbar reservoir with 20 nodes. According to this adjacency matrix NMX, the crossbar reservoir having 20 nodes is divided into an input node group of nodes N7, N8, a first output node group N1, N2, a second output node group N19, N20, a first intermediate node group N3 to N6, and a second intermediate node group N9 to N18.

A first partial reservoir includes the input node group N7, N8 (IN_nd), the first output node group N1, N2, and the first intermediate node group N3 to N6. The product sum value of the readout values of the first output node group N1, N2 (OUT_nd_1) and the output weights is the first output OUT1. Similarly, a second partial reservoir includes the input node group N7, N8 (IN_nd), the second output node group N19, N20 (OUT_nd_2), and the second intermediate node group N9 to N18. The product sum value of the readout values of the second output node group N19, N21 and the output weights is the second output OUT2.

As illustrated in FIG. 12, in the areas other than the areas AREA_1 and AREA_2, weight values are assigned to arbitrary intersection positions. In the other intersection positions, weight=0 indicates an unconnected state. The initial weights set in the intersection positions of the crossbar reservoir are designed as appropriate in accordance with the object to be realized by the reservoir computing model.

The adjacency matrices of FIGS. 10, 11, and 12 can also be applied to a material reservoir. A material reservoir generates a nonlinear readout value in the output node in response to input applied to the input node, and therefore, by setting the weights so as to correspond to this nonlinearity, it is possible to design an adjacency matrix of a reservoir having a target nonlinearity.

FIG. 13 is a flowchart illustrating a training process executed on the reservoir computing models of the first and second embodiments. The processor executes the following processing by executing the training program. First, the processor initializes the output weight of the reservoir (S1). Next, the processor inputs an input value of the training data into the input node of the reservoir (S2). When the input value is input into the input node, in the physical reservoir, the first partial reservoir, which has a smaller number of nodes or a smaller size, generates states of the respective nodes based on the input value, past node states, and the inter-node connections and node self-connections (S3). Similarly, in the physical reservoir, the second partial reservoir, in which the number of nodes between the input layer and the output layer is larger than in the first partial reservoir or the size between the input layer and the output layer is larger than in the first partial reservoir, generates states of the respective nodes based on the input value, past node states, and the inter-node connections and node self-connections (S4). In other words, in response to input of the same input value, the respective states of the first partial reservoir and the second partial reservoir transition, whereby the states of the first output node of the first partial reservoir and the second output node of the second partial reservoir transition.

The aforesaid state transitions of the first partial reservoir and second partial reservoir may also be achieved by having the processor calculate the states of the first output node of the first partial reservoir and the second output node of the second partial reservoir by calculating the state transitions of the first and second partial reservoirs.

Next, the processor executes first parameter adjustment for adjusting the output weight of the first partial reservoir to an optimum value (S5). In the first parameter adjustment, with respect to a first fully connected layer having, as a first output, a product sum value calculated by a linear combination based on the readout values and the first output weight of the first output nodes of the first partial reservoir, the processor updates the first output weight so as to reduce the difference between the first output and the teaching data. The output weight can be updated using the gradient method or learn the output weight using a simple algorithm such as linear regression.

Further, the processor sets the first output weight of the first partial reservoir at the updated value, calculates the first output relative to the input value of step S2, and calculates the difference between the first output and the teaching data as differential teaching data (S6).

Next, the processor executes second parameter adjustment for adjusting the output weight of the second partial reservoir to an optimum value (S7). In the second parameter adjustment, with respect to a second fully connected layer having, as a second output, a product sum value calculated based on the readout value and the second output weight of the second output node of the second partial reservoir, acquired or calculated in step S4, the processor updates the second output weight so as to reduce the difference between the second output and the differential teaching data. Updating of this output weight of the second partial reservoir is identical to that of the first partial reservoir except that the differential teaching data is used in the second partial reservoir, not the teaching data.

The processor executes the processing from step S2, in which the input value of the training data is input, to step S7, i.e., the second parameter adjustment, repeatedly on all the training data (S8). Alternatively, the processing is executed repeatedly on a plurality of training data until the output accuracy of the model reaches a target accuracy. The output accuracy of the model is determined by dividing the difference between the sum of the first output of the readout portion of the first partial reservoir and the second output of the readout portion of the second partial reservoir and the teaching data by this sum, or the like.

In the training process performed on the first partial reservoir, since the first partial reservoir has a smaller size and a smaller number of nodes, a comparatively low-dimensional function model is generated. As a result, the first partial reservoir and the corresponding readout portion, having been optimized by the training, generate a first output of a low-frequency component. Since the function is low-dimensional, overtraining can be avoided in the training process. The second partial reservoir, on the other hand, has a larger size and a larger number of nodes than the first partial reservoir, and therefore the second partial reservoir generates a function model of a higher dimension than the first partial reservoir. As a result, the second partial reservoir and the corresponding readout portion, having been optimized by the training, generate a second output of a high-frequency component. The sum of the first output and the second output is the output of the reservoir computing model. Hence, the reservoir computing model is capable of generating an output in which the second output of the high-frequency component is added to the first output of the low-frequency component.

FIG. 14 is a flowchart illustrating the processing of an inference process performed by the reservoir computing models according to the first and second embodiments. The processor inputs an input value into the reservoir (S10). In the physical reservoir, the respective states of the first partial reservoir, which has a small number of nodes and a small size, and the second partial reservoir, which has a large number of nodes and a large size, transition based on the input value, the states of the respective reservoirs corresponding to the past input history, and the inter-node connections and node self-connections (S11, S12). Further, the processor calculates the first output of the readout portion based on the value of the output node and the output weight of the first partial reservoir (S13), and calculates the second output of the readout portion based on the value of the output node and the output weight of the second partial reservoir (S14). The output weights at this time are the optimal output weights adjusted in the training process. The processor then calculates an inference value by calculating the sum of the first output and the second output (S15). The processor repeats the inference process S10 to S15 described above until inference is complete (S16).

In the inference process, similarly to the training process, the processor generates a low-frequency component of the inference output using the first partial reservoir and the readout portion thereof, and generates a high-frequency component of the inference output using the second partial reservoir and the readout portion thereof. According to this embodiment, the training process does not produce an overtrained state, and therefore a highly generalized reservoir computing model can be generated.

Figure 15:
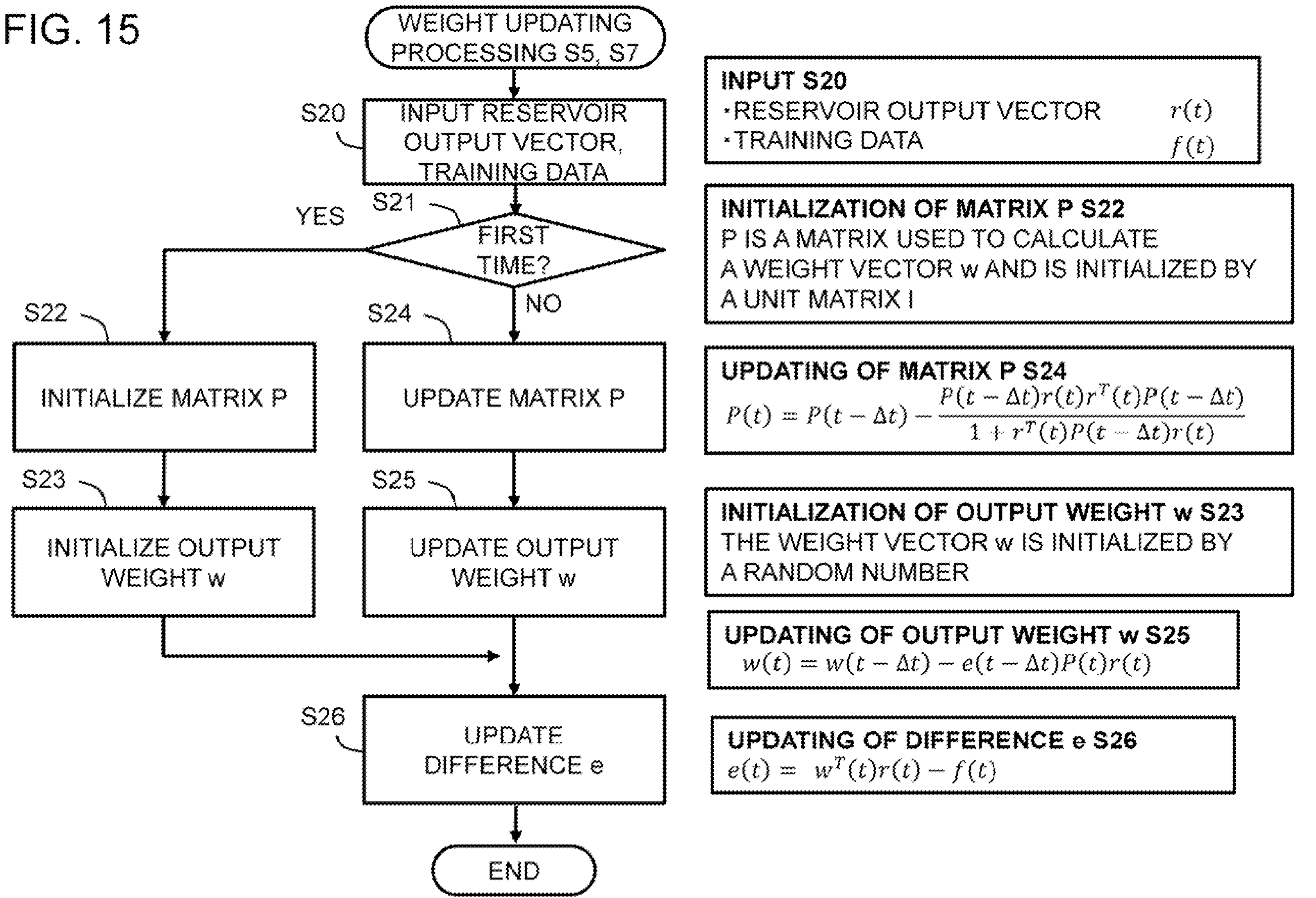
FIG. 15 is a flowchart of FORCE learning for updating the output weights of the training process.

FIG. 15 is a flowchart of FORCE learning for updating the output weights of the training process. In FORCE learning (First Order Reduced and Controlled Error Learning), first, the processor inputs a reservoir output vector (a vector of the readout value output by the output node) r(t) and teaching data f(t) (S20). When there are n output nodes, the reservoir output vector r(t) is a matrix of 1 row and n columns at a time t, and the readout values of the n output nodes form n elements on the matrix.

Next, when learning is to be performed for the first time (YES in S21), the processor initializes a matrix P(t) and an output weight w(t) (S22, S23). The matrix P is a matrix for calculating an output weight vector w(t) and is initialized by means of a unit matrix I. A difference e is then updated (S26).

Next, the processor inputs the reservoir output vector r(t) and the teaching data f(t) (S20), and since this is not the first time (NO in S21), the processor updates the matrix P and the output weight w(t) (S24, S25). Calculation formulae for the respective updates are illustrated in FIG. 15. To update the matrix P, the processor calculates the matrix P(t) of the current time t from a matrix P(t−Δt) of an immediately preceding time t−Δt using the calculation formula indicated in S24 (S24). Further, to update the output weight w, the processor calculates the output weight w(t) of the current time t from an output weight w(t−Δt) of the immediately preceding time t−Δt using the calculation formula indicated in S25 (S25). The processor then updates the difference e (S26). To update the difference e, the processor performs a multiply-accumulate operation by multiplying the reservoir output vector r(t) of the current time t by a transposed matrix of the output weight w updated at the current time t, and then outputs the difference between the multiply-accumulate operation value and the teaching data f(t) as the difference e(t) at the current time t.

Thereafter, the processor repeats the processing for updating the output weight w(t) by executing steps S24 to S26 each time new training data and a new reservoir output vector are input. The processing for updating the output weight, described above, is performed in the processing S5 for updating the output weight of the readout portion of the first partial reservoir and the processing S7 for updating the output weight of the readout portion of the second partial reservoir, illustrated in FIG. 13. In the processing S7 for updating the output weight of the readout portion of the second partial reservoir, differential teaching data are used as the training data.

Figure 16:
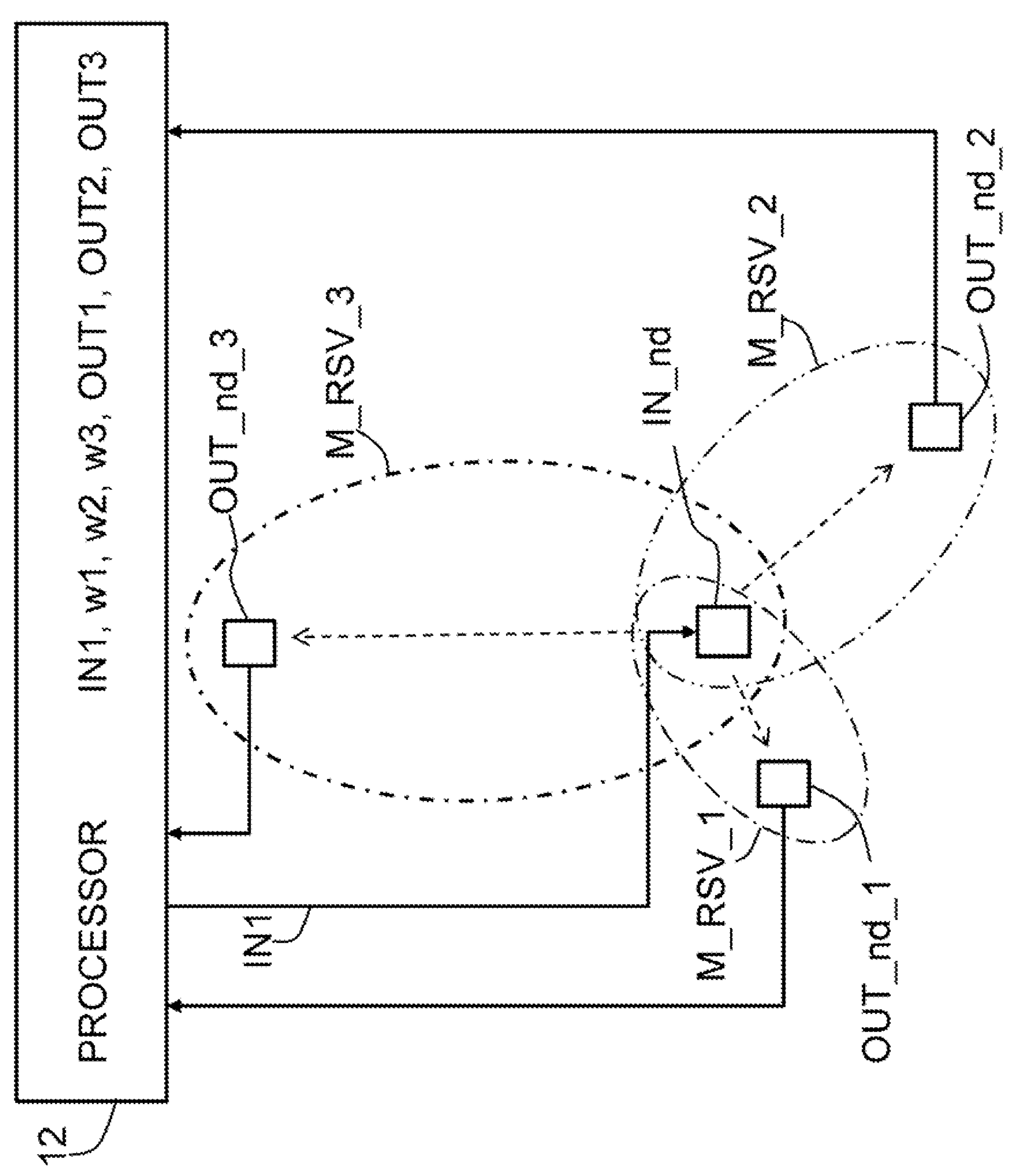
FIG. 16 is a view depicting a reservoir computing model according to a third embodiment.

FIG. 16 is a view depicting a reservoir computing model according to a third embodiment. The model of FIG. 16, similarly to FIG. 9, is an information processing system including the material reservoir M_RSV and the information processing device 10.

The material reservoir M_RSV includes the first partial reservoir M_RSV_1, the second partial reservoir M_RSV_2 that has a larger size and a function characteristic of a higher dimension than the first partial reservoir M_RSV_1, and a third partial reservoir M_RSV_3 that has a larger size and a function characteristic of a higher dimension than the second partial reservoir M_RSV_2. The first partial reservoir M_RSV_1, second partial reservoir M_RSV_2, and third partial reservoir M_RSV_3 have a partially overlapping area, and the input node IN_nd of the common input layer is provided therein. Further, the nodes OUT_nd_1, OUT_nd_2, OUT_nd_3 of the output layers are provided respectively in the first, second, and third partial reservoirs M_RSV_1, M_RSV_2, and M_RSV_3.

Similarly to the first embodiment, the readout values from the output nodes OUT_nd_1, OUT_nd_2, OUT_nd_3 of the respective output layers are input into the information processing device 10, whereupon the processor 12 calculates product sum values constituted by linear combinations of the readout values and the output weights, thereby generating three outputs OUT1, OUT2, and OUT3, and calculates the sum thereof as the output of the crossbar reservoir.

Further, the processor optimizes the output weights by using the training data in the training process. In the training process, as illustrated in FIG. 13, the input value of the training data is input into the input node IN_nd, whereupon the states of the three partial reservoirs are caused to transition and the weights of the respective readout portions of the three partial reservoirs are updated in increasing order of size from the partial reservoir having the smallest size. In this case, in the second partial reservoir and the readout portion thereof, the difference between the first output, which is calculated based on the updated output weight of the readout portion of the first partial reservoir, and the teaching data is set as differential teaching data. Further, in the third partial reservoir and the readout portion thereof, the difference between a sum of the first output, which is calculated based on the updated output weight of the readout portion of the first partial reservoir, and the second output of the second partial reservoir, which is similar to the first output, and the teaching data is set as differential teaching data. The processor outputs the sum of the first, second, and third outputs corresponding respectively to the three partial reservoirs as the output of the material reservoir.

EXAMPLE

In an example, the crossbar reservoir of FIG. 8 was realized by having a processor execute a state transition calculation program for a crossbar reservoir. An example of the weights of the inter-node connections and self-connections and the input node and two output nodes of the crossbar reservoir is similar to FIG. 12, for example. Note, however, that contrast to the 20 nodes of FIG. 12, in this example, the number of nodes was set at 100, i.e., five times more than FIG. 12. The processor was configured to execute a state transition calculation program for a case in which circuit elements such as nonlinear memristors were provided on the intersections of the crossbar structure.

Further, in this example, 10 input nodes, 10 first output nodes, and 10 second output nodes were provided, while the number of nodes on the first middle layer of the first partial reservoir was set at 20 and the number of nodes on the second middle layer of the second partial reservoir was set at 50. The inter-node connections and self-connections of the crossbar reservoir were chosen at random, and connections between distant nodes, such as the input node and the output node, were left unconnected.

As a comparative example, a reservoir not divided into a plurality of partial reservoirs was used, and a reservoir model in which the total number of nodes was set at 100, with 10 input nodes, 10 output nodes, and 80 nodes on the middle layer, was employed.

In a test of the example, the task set for the model was to predict a nonlinear function known as NARMA10.

NARMA10 is generally known as a method for evaluating an RNN. The nonlinear function of NARMA10 outputs time-series numerical value data in response to the input of time-series input data of a certain length. The input and the output time-series numerical value data serve as the input data of the training data and the teaching data.

In the test of the example, the input data of the training data described above were input in time series into the reservoir computing model of the example, and using corresponding teaching data, training for optimizing the output weight of the model was executed repeatedly. Then, the normalized root-mean-square deviation (NRMSE) of an error between the output data generated by the model when the input data of NARMA10 were applied to the trained model and correct answer data output by the function of NARMA10 was calculated. Further, the reservoir model of the comparative example was trained in a similar manner, whereupon the error after the training was calculated. As a result, the error in the reservoir model of the comparative model was 0.2033, whereas the error in the reservoir model according to this embodiment was 0.1718, i.e., smaller than that of the comparative example.

In the reservoir computing model according to this embodiment, as described above, a common input is input into a plurality of partial models having successively larger reservoir sizes, whereupon training is performed to update the output weights of the readout portions of the respective partial reservoirs in ascending order of size so as to reduce the difference between the output and the teaching data. In this case, the respective output weights are updated so that in the first partial reservoir having the smallest size and the readout portion thereof, the difference between the first output of the readout portion and the teaching data is reduced, in the second partial reservoir having the next smallest size and the readout portion thereof, the difference between the second output of the readout portion and differential training data (a value acquired by subtracting the first output calculated based on the updated output weight from the teaching data) is reduced, and in a Kth partial reservoir and the readout portion thereof, the difference between the Kth output of the readout portion and differential training data (a value acquired by subtracting the sum of first to K−1th outputs calculated based on the updated output weights from the teaching data) is reduced.

According to this embodiment, the reservoir computing model is configured such that the partial reservoir having the smallest size and the readout portion thereof generate the lowest-wavelength component of the output, while the higher-wavelength components of the output are generated in increasing order of size. Thus, overtraining in the training process can be suppressed, and as a result, a highly generalized reservoir computing model can be generated.

According to the embodiment, the occurrence of an overfitted state caused by overtraining is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10 Information processing device
12 Processor
18 Physical reservoir
RSV Reservoir
C_RSV Crossbar reservoir
M_RSV Material reservoir
C_RSV_1 First partial reservoir
C_RSV_2 Second partial reservoir
INL Input layer
OUTL Output layer
MIDL Middle layer
FCL Fully connected layer, readout portion
IN_nd Input node
OUT_nd_1, OUT_nd_2 Output node
OUT1, OUT2 Output
w1, w2 Output weight
N1 to N5 Nodes

The invention claimed is:

1. An information processing system comprising:
an information processing device including a memory and a processor that accesses the memory; and
a reservoir which is supplied with input by the information processor and transitions from a past state to a current state in response to the input, the reservoir includes
an input layer to which the input is applied,
a first output layer configured to output a plurality of first readout values based on the input,
a second output layer configured to output a plurality of second readout values based on the input,
a first partial reservoir including the input layer and the first output layer, and
a second partial reservoir including the input layer and the second output layer and in which the size between the input layer and the second output layer is larger than the size between the input layer and the first output layer of the first partial reservoir, and
the processor executes processing for training the reservoir,
the training processing including:
first processing
to update a plurality of first output weights to reduce a difference between
a first output that is a first product sum value of a plurality of third readout values and the plurality of first output weights, the plurality of third readout values being output by the first output layer based on a first input, and
teaching data corresponding to the first input, and
to calculate a differential teaching data that is a difference between
a third product sum value of the plurality of third readout values and the updated plurality of first output weights, and
the teaching data corresponding to the first input; and
second processing to update a plurality of second output weights to reduce a difference between
a second output that is a second product sum value of a plurality of fourth readout values and the plurality of second output weights, the plurality of fourth readout values being output by the second output layer based on the first input, and the differential teaching data, the first processing and the second processing are repeated for a plurality of training data respectively including a first input and a teaching data.

2. The information processing system according to claim 1, wherein the processor executes inference processing on the reservoir after updating the plurality of first output weights and the plurality of second output weights by the training processing, the inference processing including processing to calculate a sum of a third output having a fourth product sum value of a plurality of fifth readout values and the updated plurality of first output weights, the plurality of fifth readout values being output by the first output layer based on a second input, and a fourth output having a fifth product sum value of a plurality of sixth readout values and the updated plurality of second output weights, the plurality of sixth readout values being output by the second output layer based on the second input.

3. The information processing system according to claim 1, wherein the reservoir includes a plurality of nodes, inter-node connections having weights formed between arbitrary nodes among the plurality of nodes, and self-connections having weights formed in arbitrary nodes among the plurality of nodes, the first partial reservoir includes one part of the plurality of nodes, and the second partial reservoir includes another part of the plurality of nodes, the other part of the plurality of nodes including a larger number of nodes than the one part of the plurality of nodes.

4. The information processing system according to claim 3, wherein the reservoir is a crossbar including a plurality of column lines corresponding to inputs of the plurality of nodes, a plurality of row lines corresponding to outputs of the plurality of nodes, and the self-connections or the inter-node connections, which are formed in predetermined intersection positions between the plurality of column lines and the plurality of row lines.

5. The information processing system according to claim 1, wherein the reservoir is a material reservoir that outputs an output having a nonlinear characteristic based on an input, the input layer is provided in an arbitrary input position of the material reservoir, the first output layer is provided in a first output position of the material reservoir, and the second output layer is provided in a second output position of the material reservoir, the second output position having a greater distance to the input position than the distance between the input position and the first output position.

6. An information processing device comprising:

a memory; and a processor that accesses the memory, the information processing device being configured to communicate with a reservoir which is supplied with input by the information processor and transitions from a past state to a current state in response to the input, the reservoir includes an input layer to which the input is applied, a first output layer configured to output a plurality of first readout values based on the input, a second output layer configured to output a plurality of second readout values based on the input, a first partial reservoir including the input layer and the first output layer, and a second partial reservoir including the input layer and the second output layer and in which the size between the input layer and the second output layer is larger than the size between the input layer and the first output layer of the first partial reservoir, and the processor executes processing for training the reservoir, the training processing including:

first processing to update a plurality of first output weights to reduce a difference between a first output that is a first product sum value of a plurality of third readout values and the plurality of first output weights, the plurality of third readout values being output by the first output layer based on a first input, and teaching data corresponding to the first input, and to calculate a differential teaching data that is a difference between a third product sum value of the plurality of third readout values and the updated plurality of first output weights, and the teaching data corresponding to the first input; and second processing to update a plurality of second output weights to reduce a difference between a second output that is a second product sum value of a plurality of fourth readout values and the plurality of second output weights, the plurality of fourth readout values being output by the second output layer based on the first input, and the differential teaching data, the first processing and the second processing are repeated for a plurality of training data respectively including a first input and a teaching data.

7. A non-transitory computer readable memory medium that stores therein an information processing program causing a processor of an information processing device to execute an information processing, the information processing comprising:

a processing for training a reservoir, the information processing device includes a memory, and a processor that accesses the memory, the information processing device being configured to communicate with the reservoir which is supplied with input by the information processor and transitions from a past state to a current state in response to the input, and the reservoir includes an input layer to which the input is applied, a first output layer configured to output a plurality of first readout values based on the input, a second output layer configured to output a plurality of second readout values based on the input, a first partial reservoir including the input layer and the first output layer, and a second partial reservoir including the input layer and the second output layer and in which the size between the input layer and the second output layer is larger than the size between the input layer and the first output layer of the first partial reservoir, and the processor executes processing for training the reservoir, the training processing including:

first processing to update a plurality of first output weights to reduce a difference between
a first output that is a first product sum value of a plurality of third readout values and the plurality of first output weights, the plurality of third readout values being output by the first output layer based on a first input, and
teaching data corresponding to the first input, and
to calculate a differential teaching data that is a difference between
a third product sum value of the plurality of third readout values and the updated plurality of first output weights, and
the teaching data corresponding to the first input; and
second processing to update a plurality of second output weights to reduce a difference between
a second output that is a second product sum value of a plurality of fourth readout values and the plurality of second output weights, the plurality of fourth readout values being output by the second output layer based on the first input, and
the differential teaching data,
the first processing and the second processing are repeated for a plurality of training data respectively including a first input and a teaching data.

* * * * *